US009409555B2

(12) United States Patent
Yamamoto et al.

(10) Patent No.: US 9,409,555 B2
(45) Date of Patent: Aug. 9, 2016

(54) BRAKE SYSTEM

(71) Applicant: TOYOTA JIDOSHA KABUSHIKI KAISHA, Toyota-shi, Aichi-ken (JP)

(72) Inventors: Shinsuke Yamamoto, Anjo (JP); Hiroshi Omine, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/781,253

(22) PCT Filed: Mar. 27, 2014

(86) PCT No.: PCT/IB2014/000427
§ 371 (c)(1),
(2) Date: Sep. 29, 2015

(87) PCT Pub. No.: WO2014/155182
PCT Pub. Date: Oct. 2, 2014

(65) Prior Publication Data
US 2016/0052494 A1    Feb. 25, 2016

(30) Foreign Application Priority Data

Mar. 29, 2013  (JP) ................................. 2013-072501

(51) Int. Cl.
*G06F 7/70* (2006.01)
*B60T 7/12* (2006.01)
(Continued)

(52) U.S. Cl.
CPC ................. *B60T 7/12* (2013.01); *B60T 8/4872* (2013.01); *B60T 13/588* (2013.01)

(58) Field of Classification Search
USPC .......................................................... 701/70
See application file for complete search history.

(56) References Cited

U.S. PATENT DOCUMENTS

| 6,017,102 A   | 1/2000 | Aga      |              |
|---------------|--------|----------|--------------|
| 6,059,380 A * | 5/2000 | Pueschel | B60T 8/175   |
|               |        |          | 303/113.2    |
| 6,554,373 B1 *| 4/2003 | Bill     | B60T 8/3265  |
|               |        |          | 303/113.4    |

(Continued)

FOREIGN PATENT DOCUMENTS

| JP | H045155 A   | 1/1992 |
| JP | H10147222 A | 6/1998 |

(Continued)

OTHER PUBLICATIONS

Partial Translation of Feb. 23, 2015 Office Action issued in Japanese Patent Application No. 2013-072501.

*Primary Examiner* — Hussein A. Elchanti
(74) *Attorney, Agent, or Firm* — Oliff PLC

(57) ABSTRACT

A brake, system includes a hydraulic brake that supplies a hydraulic pressure to a cylinder provided correspondingly to each wheel mounted on a vehicle, thereby pressing friction members against the wheels and applying a hydraulic braking force; an electric brake that is mounted on at least one wheel from among the wheels and applies a braking force to the wheel by drive of an electric actuator; and a controller that executes control of supply of hydraulic pressure to each wheel cylinder by the hydraulic brake and operation control of the electric brake, regardless of a braking request by a driver, and causes a transition from hydraulic braking force control of all of the wheels to hydraulic braking force control of the wheel on which the electric brake has been mounted, when a speed of the vehicle satisfies a condition during the hydraulic braking force control of all of the wheels.

13 Claims, 20 Drawing Sheets

(51) Int. Cl.
*B60T 13/58* (2006.01)
*B60T 8/48* (2006.01)

(56) References Cited

U.S. PATENT DOCUMENTS

| | | | | |
|---|---|---|---|---|
| 2003/0033073 A1* | 2/2003 | Kichima | ............ | B60K 31/0008 |
| | | | | 701/96 |
| 2006/0212207 A1* | 9/2006 | Sugano | ................ | B60W 10/06 |
| | | | | 701/93 |
| 2009/0314256 A1* | 12/2009 | Bland | ..................... | F02C 3/305 |
| | | | | 123/456 |
| 2010/0213757 A1* | 8/2010 | Wagner | ..................... | B60T 8/34 |
| | | | | 303/10 |
| 2010/0222978 A1* | 9/2010 | Kodama | ..................... | B60L 7/26 |
| | | | | 701/70 |

FOREIGN PATENT DOCUMENTS

| | | |
|---|---|---|
| JP | 2000313322 A | 11/2000 |
| JP | 2001018777 A | 1/2001 |
| JP | 2007015553 A | 1/2007 |
| JP | 2007069684 A | 3/2007 |
| JP | 2007230277 A | 9/2007 |

* cited by examiner

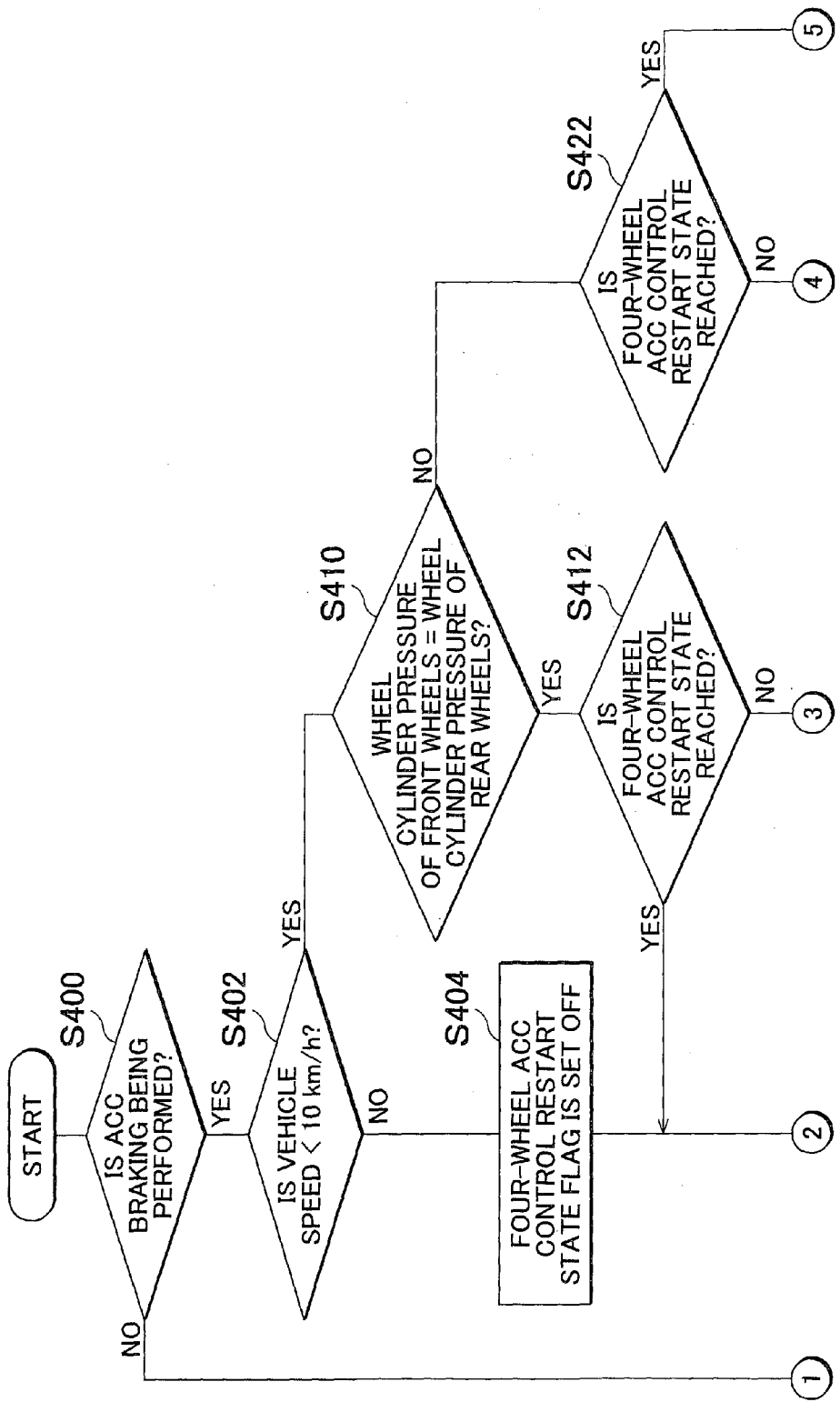

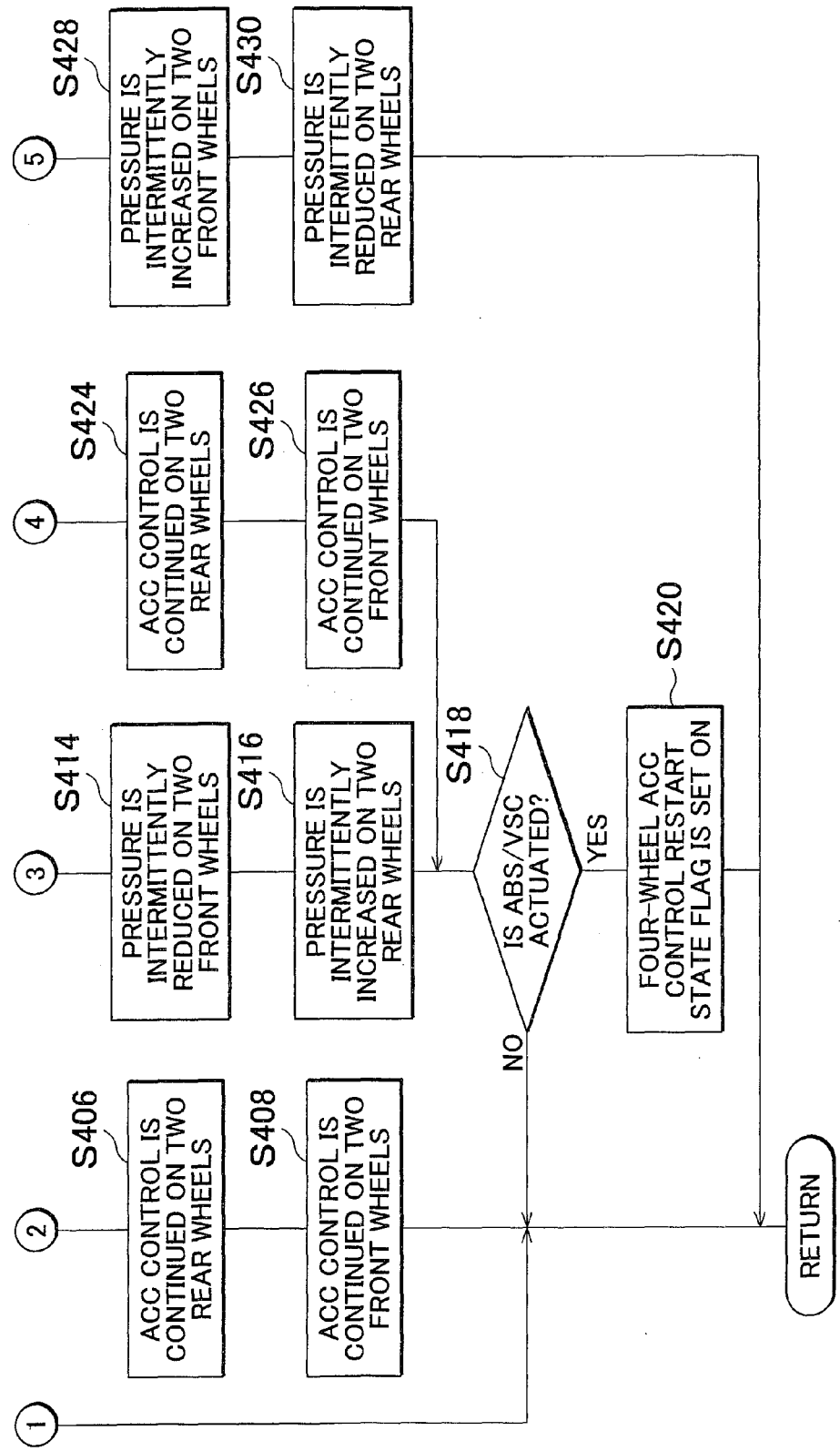

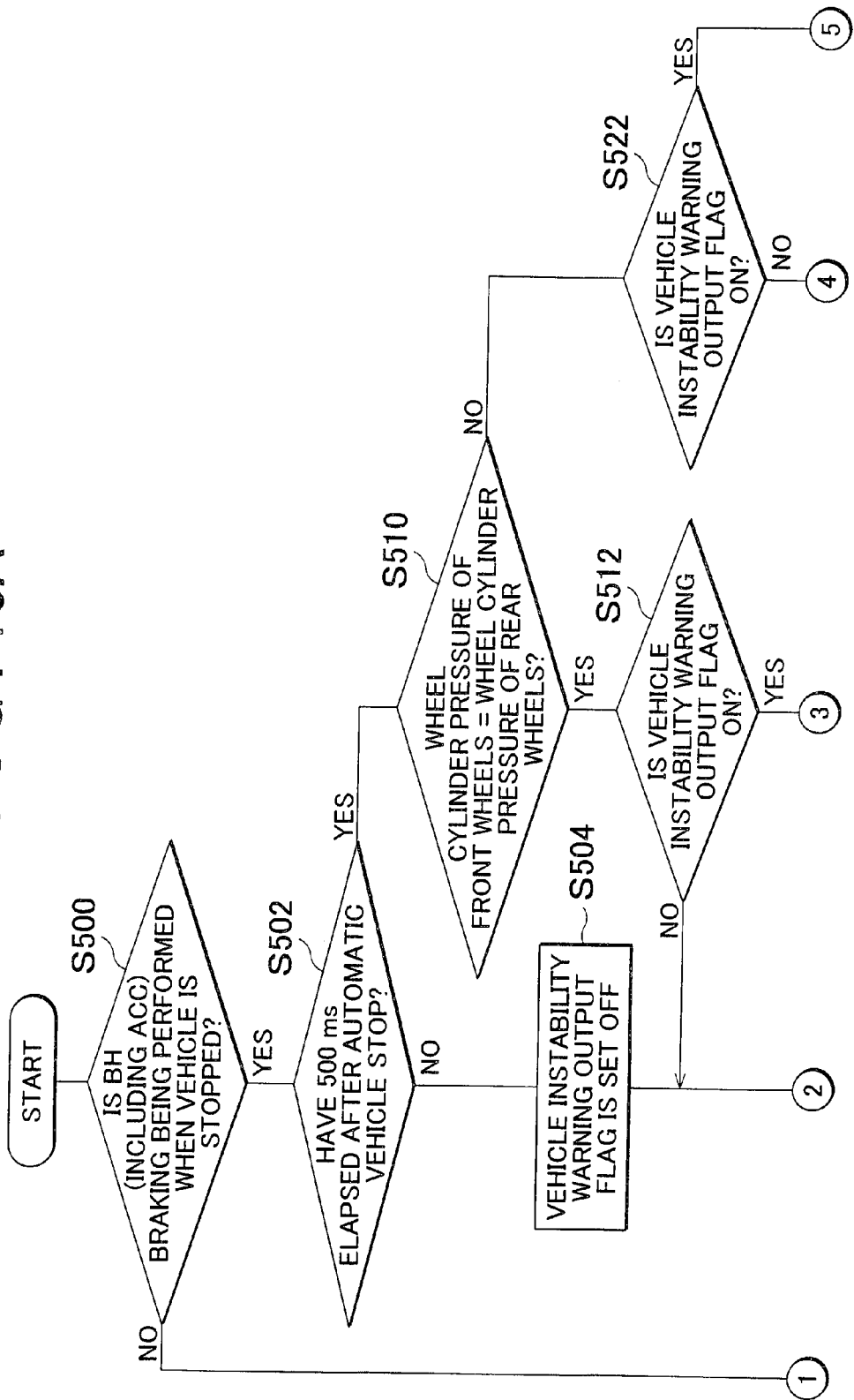
F I G. 16A

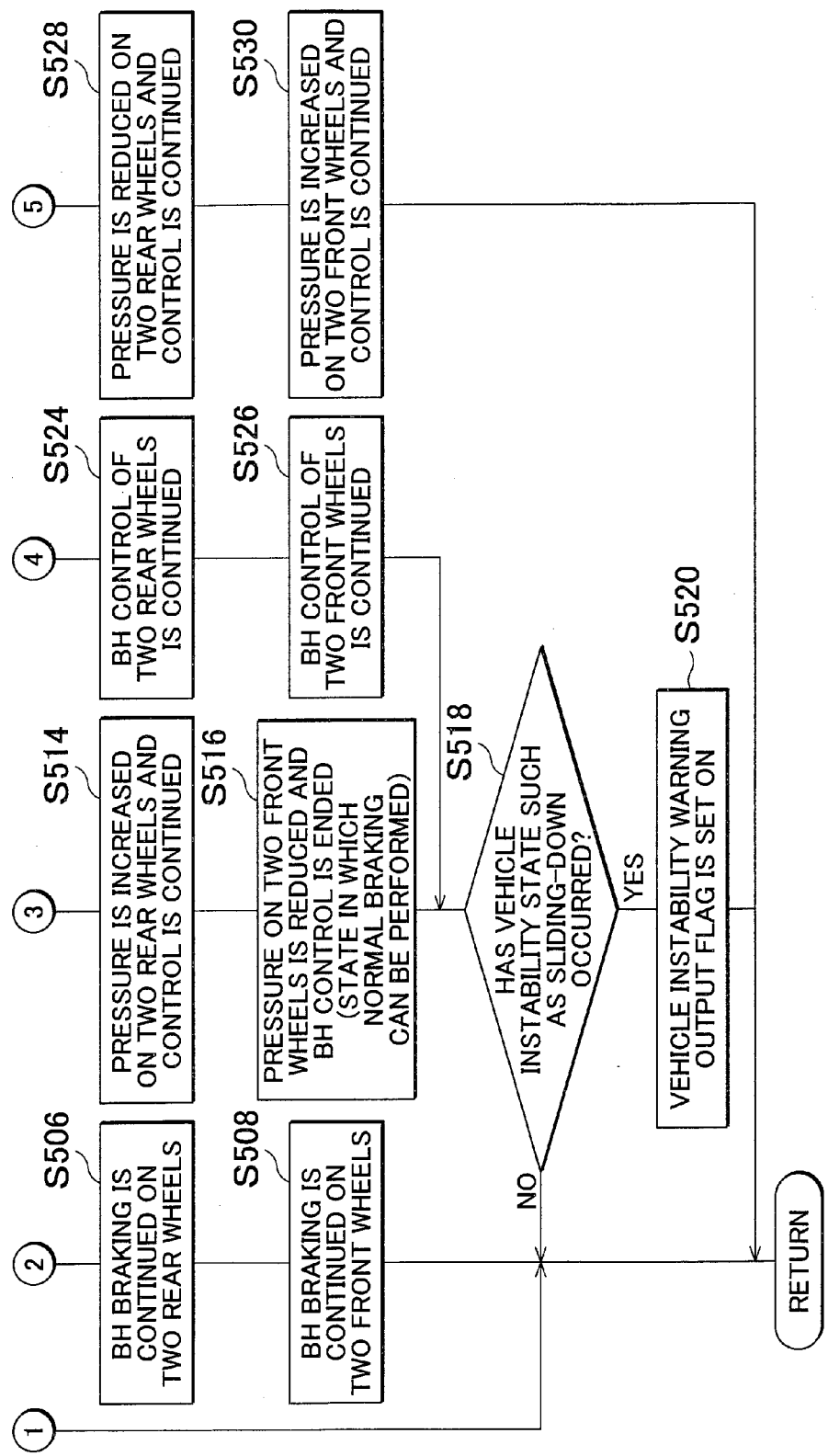

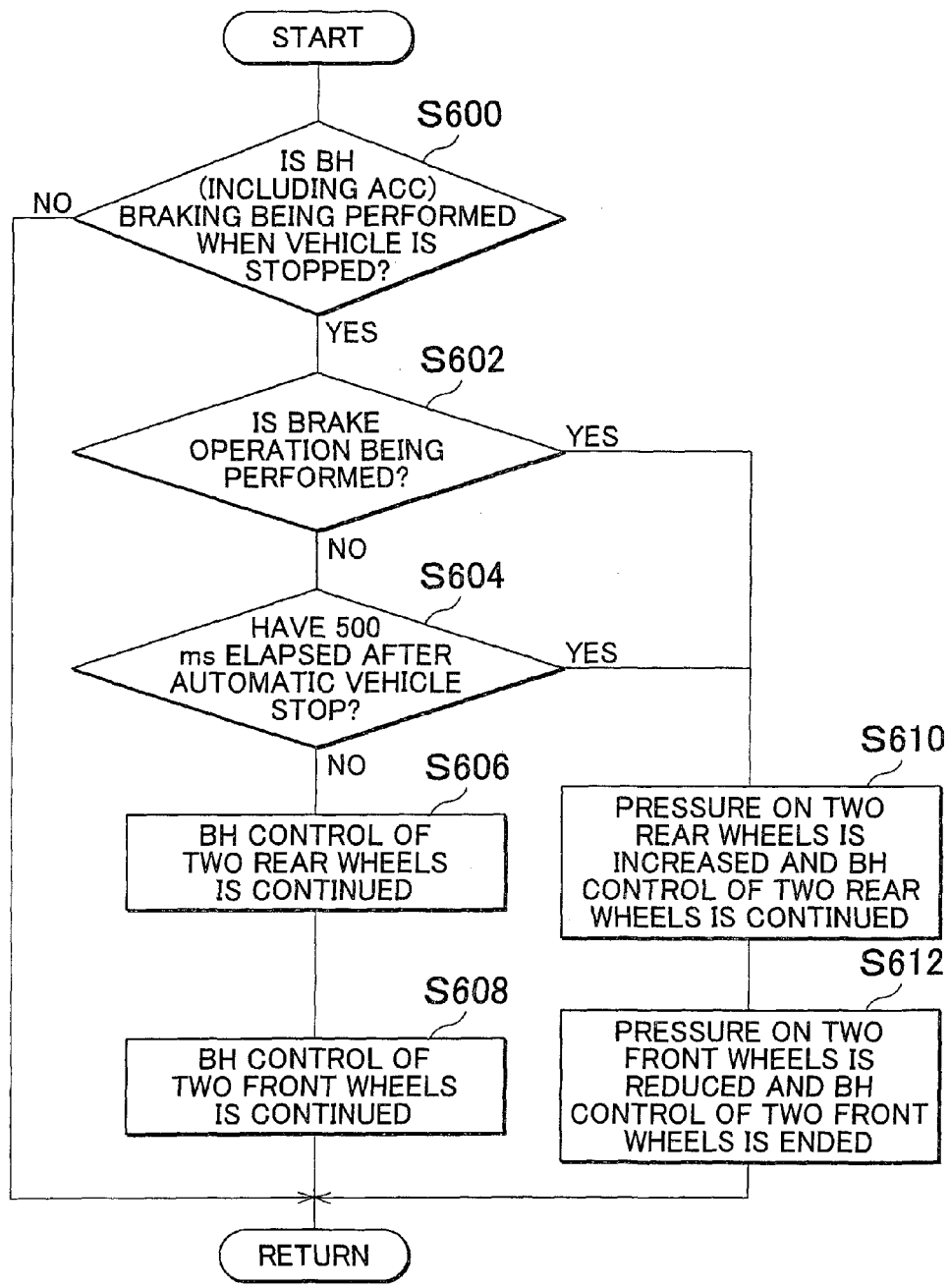

BRAKE SYSTEM

BACKGROUND OF THE INVENTION

1. Field of the Invention

The invention relates to a brake system, and more particularly to a brake system in which cooperation control of a hydraulic braking device and an electric parking brake device is performed.

2. Description of Related Art

A disk brake device and a drum brake device are available as brake devices for vehicles. The brake device of each type is configured such that the hydraulic pressure corresponding to the working liquid delivered from a master cylinder according to the depression amount of a brake pedal operated by a driver is supplied to the wheel cylinder of the disk brake device or drum brake device, thereby generating a braking force (referred to hereinbelow as hydraulic braking force control). A parking brake device that maintains the stopping state of a vehicle when the vehicle is stopped for a comparatively long time or parked is also available. The parking brake device is usually of a manual type in which a braking force is generated when a driver operates a lever, but electric parking brake devices using an electric motor has also been in practical use. In the electric parking brake device, a nut disposed inside a piston is advanced by the electric motor, the piston is pressed, for example, against the brake pad of a disk brake device, and the brake pad is pushed against the disk rotor, thereby generating a braking force.

Meanwhile, vehicles provided with an assist function of performing the braking control automatically according to the state of vehicle surrounds have been also put to practical use. For example, there are systems such that when the host vehicle travels following a vehicle that travels ahead thereof and the vehicle ahead is decelerated or stopped, hydraulic braking force control is executed and the host vehicle is decelerated or stopped without participation of the driver. There are also vehicles such that where the vehicle is automatically stopped and a predetermined period of time elapses thereafter, an electric parking brake device is automatically actuated and controlled to maintain the stopping state of the vehicle (see, for example, Japanese Patent Application Publication Nos. 2007-230277 (JP 2007-230277 A) and 2007-069684 (JP 2007-069684 A).

In this case, the vehicle is decelerated and stopped by performing hydraulic braking force control, for example, of a disk brake device mounted on each wheel (four wheels). After a predetermined time elapses, the electric parking brake devices mounted, for example, on two rear wheels are actuated to maintain the stopping state of the vehicle.

The braking force generated by the brake device is determined by the friction coefficient of the road and a load (ground contact load) applied from the vehicle to the road. Therefore, where a vehicle is decelerated and stopped on a low-μ slope, a stable vehicle stopping posture can be obtained with four wheels, but with two wheels, the vehicle stopping posture changes, and the vehicle occupants can feel uncomfortable. Further, when switching is performed from hydraulic braking force control of four wheels to braking by the two-wheel electric parking brake, a switching shock (vibrations) caused by a change in the number of the braked wheels and a change in the braking method can occur. In addition, when the hydraulic braking force control is automatically executed, a wheel cylinder corresponding to each wheel is in a high-pressure state created by the working liquid. Therefore, even if the driver performs a braking request operation, that is, depresses the brake pedal during the automatic braking force control, the hydraulic liquid cannot flow into the wheel cylinder. Therefore, the stroke of the brake pedal is made difficult, and the driver can feel uncomfortable.

SUMMARY OF THE INVENTION

The invention provides a brake system capable of reducing the uncomfortable feeling to the driver that occurs when using a control technique of automatically switching from hydraulic braking force control to operation control of an electric parking brake device.

According to a first aspect of the invention, a brake system includes a hydraulic brake device that supplies a hydraulic pressure to a wheel cylinder provided correspondingly to each wheel mounted on a vehicle, thereby pressing friction members against the wheels and applying a hydraulic braking force; an electric parking brake device that is mounted on at least one wheel from among the wheels and applies a braking force to the wheel by drive of an electric actuator; and a controller that executes control of supply of hydraulic pressure to each wheel cylinder by the hydraulic brake device and operation control of the electric parking brake device, regardless of a braking request operation performed by a driver, and causes a transition from hydraulic braking force control of all of the wheels to hydraulic braking force control of the wheel on which the electric parking brake device has been mounted, when a speed state of the vehicle satisfies a predetermined speed condition during the hydraulic braking force control of all of the wheels.

According to the first aspect, a transition from hydraulic braking force control of all of the wheels to hydraulic braking force control of the wheel on which the electric parking brake device has been mounted is performed when a speed state of the vehicle satisfies a predetermined speed condition during the hydraulic braking force control of all of the wheels. In this case, since the control transition takes place during the hydraulic braking force control, changes in the braking force are continuous and the occurrence of shocks such as those caused by a change in the braking method can be inhibited. Further, since the transition to the control of the wheel on which the electric parking brake device has been mounted is performed at a stage before switching to the electric parking brake device, the wheel to be controlled when switching from the hydraulic braking force control to the operation control of the electric parking brake device is not changed. As a result, changes in the vehicle stopping posture during the switching can be reduced. Further, the hydraulic braking force control is switched from all of the wheels to the wheel on which the electric parking brake device has been mounted. In other words, a state is reached in which the hydraulic pressure can be received by the wheels on which the electric parking brake device has not been mounted. As a result, even when the braking control is executed automatically, regardless of the braking request operation performed by the driver, the hydraulic pressure generated by the depression of the brake pedal can be received and the uncomfortable feeling imparted to the driver when the brake pedal feels hard to depress can be inhibited.

When the transition to the hydraulic braking force control of the wheel on which the electric parking brake device has been mounted is Completed, and a predetermined condition is fulfilled after the vehicle has been stopped, the controller may switch from the hydraulic braking force control of the wheel on which the electric parking brake device has been mounted to the operation control of the electric parking brake device. In this case, the hydraulic braking force control can be inhibited from continuing for a long time, the consumption of battery power associated with the hydraulic braking force control can be inhibited, and heating of electronic components for performing the hydraulic braking force control can be also inhibited.

The controller may determine that the predetermined condition has been fulfilled after the vehicle has been stopped, when a predetermined set time elapses after the vehicle has been stopped. Switching to the operation control of the electric parking brake device is performed, for example, when 3 min elapse after the vehicle has been stopped. In this case, frequent switching to the electric parking brake device in the case of repeated stopping and running, as in the case of traffic congestion, can be inhibited while inhibiting the hydraulic braking force control from continuing for a long time. Further, since the number of operation cycles of the electric parking brake device can be reduced the consumption of battery power can be accordingly inhibited.

The controller determines whether or not a stopping state of the vehicle can be maintained only by the wheel on which the electric parking brake device has been mounted on the basis of behavior of the vehicle after the transition to the hydraulic braking force control of the wheel on which the electric parking brake device has been mounted is completed, and the controller does not switch to the operation control of the electric parking brake device when the stopping state cannot be maintained. With such a feature, when the stopping state of the vehicle cannot be maintained only by the wheel on which the electric parking brake device has been mounted, no braking is performed by the electric parking brake device. Therefore, the occurrence of changes in the vehicle stopping posture, such as sliding-down of the vehicle, after the vehicle has been stopped can be inhibited.

The controller may decrease the hydraulic pressure in at least one wheel from among all of the wheels when the braking request operation performed by the driver is detected during the hydraulic braking force control of all of the wheels. With such a feature, the hydraulic pressure can be received by the wheel cylinder of at least one wheel from among all of the wheels. Therefore, even when the hydraulic braking force control is executed automatically, regardless of the braking request operation performed by the driver, the working liquid can be caused to flow into the wheel cylinder. Therefore, the uncomfortable feeling imparted to the driver when the brake pedal feels hard to depress can be inhibited.

The controller may return to the hydraulic braking force control of all of the wheels when behavior stabilization control of the vehicle is executed after the transition to hydraulic braking force control of the wheel on which the electric parking brake device has been mounted. Examples of the behavior stabilization control include antilock brake control and side skid inhibiting control. When such control is executed, a return is made to the hydraulic braking force control aimed at all of the wheels. Therefore, good behavior stabilization control can be executed.

The controller may take a condition that the vehicle speed is equal to or less than a predetermined speed as the predetermined speed condition. For example, a transition from the hydraulic braking force control of all of the wheels to the hydraulic braking force control of the wheel on which the electric parking brake device has been mounted is performed when the vehicle speed is equal to or less than 10 km/h. In this case, the number of the wheels that are the object of hydraulic braking force control is changed in a low-speed region. Therefore, the change in the vehicle speed corresponding to the change in the total braking force caused by such a change is very small. As a result, the speed change caused by the transitional control can be reduced to a level that is unlikely to be felt by the vehicle occupants.

The controller may take a condition that the vehicle speed reaches zero as the predetermined speed condition. Further, the controller may take a condition that a predetermined period of time elapses after the vehicle has been stopped as the predetermined speed condition. In those cases, the number of the wheels that are the object of the hydraulic braking force control is changed after the vehicle has completely stopped. Therefore, the execution of the transitional control of the hydraulic braking force control that is performed automatically can be made unnoticeable to the vehicle occupants and changes in the vehicle behavior caused by the transitional control can be inhibited.

The controller may cancels the hydraulic control of wheels on which the electric parking brake device is not mounted when causing the transition from the hydraulic braking force control of all of the wheels to the hydraulic braking force control of the wheel on which the electric parking brake device has been mounted. In this case, a transition to the hydraulic braking force control of the wheel on which the electric parking brake device has been mounted can be caused by an easy control of performing only the pressure reduction control of the wheels on which the electric parking brake device is not mounted.

The controller may increase the hydraulic pressure of the wheel on which the electric parking brake device has been mounted prior to canceling the hydraulic control of the wheels on which the electric parking brake device is not mounted. Further, when increasing the hydraulic pressure of the wheel on which the electric parking brake device has been mounted, the controller may increase the hydraulic pressure corresponding to the hydraulic pressure of the wheels on which the electric parking brake device is not mounted and for which the hydraulic control is to be canceled. With such features, even when a transition is made from the hydraulic braking force control of all of the wheels to the hydraulic braking force control of the wheel on which the electric parking brake device has been mounted, the decrease in the total braking force can be inhibited. In particular, where the increase in the hydraulic pressure corresponds to the hydraulic pressure of the wheels on which the electric parking brake device is not mounted, no substantial changes in the total braking force are caused. Therefore, the occurrence of changes in the vehicle behavior caused by the transition in the hydraulic braking force control can be inhibited.

According to a second aspect of the invention, a brake system includes: a hydraulic brake device that supplies a hydraulic pressure to a wheel cylinder provided correspondingly to each wheel mounted on a vehicle, thereby pressing friction members against the wheels and applying a hydraulic braking force; an electric parking brake device that is mounted on at least one wheel from among the wheels and applies a braking force to the wheel by drive of an electric actuator; and a controller that can execute control of supply of hydraulic pressure to each wheel cylinder by the hydraulic brake device and operation control of the electric parking brake device, and causes a transition from hydraulic braking force control of all of the wheels to hydraulic braking force control of the wheel on which the electric parking brake device has been mounted, when a speed state of the vehicle satisfies a predetermined speed condition during the hydraulic braking force control of all of the wheels.

According to the second aspect, when the speed state of the vehicle satisfies the predetermined speed condition, for example, when the speed becomes lower than the predetermined speed, when the vehicle speed reaches zero (vehicle is stopped), or when a predetermined period of time elapses after the vehicle has been stopped, a transition is made from the hydraulic braking force control of all of the wheels to the hydraulic braking force control of the wheel on which the electric parking brake device has been mounted. In this case, since the control transition is performed during the hydraulic braking force control, the braking force changes continuously, and the occurrence of shocks such as those caused by a change in the braking method can be inhibited. Further, since the transition to the braking performed by the wheel on which the electric parking brake device has been mounted is caused at a stage prior to switching to the electric parking brake device, the number of controlled wheels is not changed when switching from the hydraulic braking force control to the operation control of the electric parking brake device. As a result, changes in the vehicle stopping posture during the switching can be reduced. Further, the hydraulic braking force control is switched from all of the wheels to the wheel on which the electric parking brake device has been mounted. In other words, a state is reached in which the hydraulic pressure can be received by the wheels on which the electric parking brake device is not mounted. As a result, even when the brake pedal is depressed, the hydraulic pressure generated by the depression can be received and an uncomfortable feeling such as a hard operation feeling of the brake pedal can be inhibited.

The invention makes it possible to reduce the uncomfortable feeling to the driver that occurs when using a control technique of switching from hydraulic braking force control to operation control of the electric parking brake device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 15A and 15B are flowcharts illustrating the hydraulic braking state in the fourth embodiment;

FIGS. 16A and 16B are flowcharts illustrating the hydraulic braking state in the fifth embodiment;

FIG. 17 is a flowchart illustrating the hydraulic braking state in the sixth embodiment.

DETAILED DESCRIPTION OF EMBODIMENTS

Figure 1:
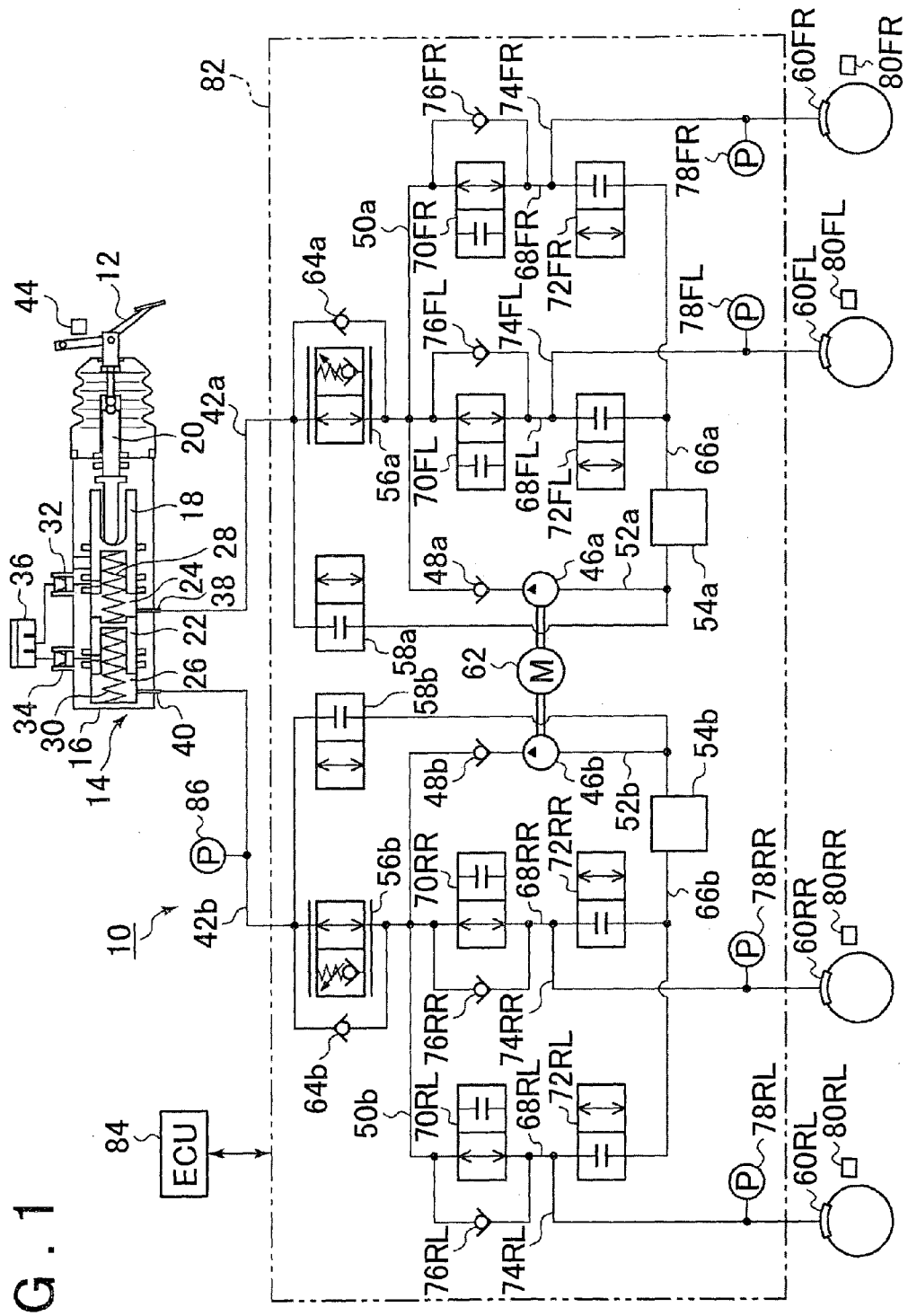
FIG. 1 is a conceptual diagram of the hydraulic circuit of the brake system according to the first to seventh embodiments.

The best modes for carrying out the invention (referred to hereinbelow as embodiments) are explained hereinbelow with reference to the appended drawings. FIG. 1 shows the configuration of a brake system 10 of the first to seventh embodiments explained hereinbelow. In a hydraulic circuit in the brake system 10 shown in FIG. 1, a system for a front left wheel and a front right wheel and a system for a rear right wheel and a rear left wheel are provided independently from each other.

The brake system 10 is provided with a master cylinder 14 generating a hydraulic pressure corresponding to the depression amount of a brake pedal 12 by the driver. In the master cylinder 14, a first piston 18 is slidably accommodated inside a cylinder housing 16. A piston rod 20 connected to a brake pedal 12 is provided at one end of the first piston 18. A second piston 22 is also slidably accommodated inside the cylinder housing 16. As a result of the two pistons being inserted into the cylinder housing 16, a first liquid chamber 24 is formed between the first piston 18 and the second piston 22, and a second liquid chamber 26 is formed between the second piston 22 and the bottom portion of the cylinder housing 16.

A first spring 28 is provided under a predetermined mounting, load between the first piston 18 and the second piston 22, and a second spring 30 is provided between the second piston 22 and the bottom portion of the cylinder housing 16.

A first input port 32 communicating with the first liquid chamber 24 and a second input port 34 communicating with the second liquid chamber 26 are formed in the side surface of the cylinder housing 16 of the master cylinder 14. The first input port 32 and the second input port 34 are communicatively connected to a master cylinder reservoir 36 serving as an external reservoir. The master cylinder reservoir 36 stores the working liquid and supplies the working liquid into the first liquid chamber 24 and the second liquid chamber 26 of the master cylinder 14 through the first input port 32 and the second input port 34.

Further, a first output port 38 communicating with the first liquid chamber 24 and a second output port 40 communicating with the second liquid chamber 26 are formed in the side surface of the cylinder housing 16 of the master cylinder 14. A brake hydraulic control conduit 42a for the front right wheel and front 'left wheel is connected to the first output port 38. A brake hydraulic control' conduit 42b for the rear left wheel and rear right wheel is connected to the second output port 40.

With the master cylinder 14 of the above-described configuration, where the brake pedal 12 is depressed and the first piston 18 and the second piston 22 are moved forward through a distance equal to or greater than a predetermined value, communication between the first and second liquid chambers 24, 26 and the master cylinder reservoir 36 is cut off by a coupling (not shown in the figures) provided in the first piston 18 and the second piston 22. As a result, a master cylinder pressure corresponding to the depression amount of the brake pedal 12 is generated in the first liquid chamber 24 and the second liquid chamber 26 of the master cylinder 14, and the working liquid is delivered from the first output port 38 and the second output port 40.

A brake switch 44, which is in the ON state when the brake pedal 12 is depressed, is provided at the pedal. A brake booster (not shown in the figure) for increasing the depression force created by the driver and generating a large braking force may be also provided between the brake pedal 12 and the master cylinder 14.

The brake system 10 also has pumps 46a, 46b. One output portion of the pump 46a is connected through a check valve 48a to a high-pressure conduit 50a. The other output portion is connected to the first port of an internal reservoir 54a through a supply conduit 52a. The high-pressure conduit 50a is connected through the below-described linear control valve 56a to the brake hydraulic control conduit 42a. The second port of the internal reservoir 54a is connected through a cut valve 58a to the brake hydraulic control conduit 42a. Further, one output portion of the pump 46b is connected through a check valve 48b to a high-pressure conduit 50b, and the other output portion is connected through a supply conduit 52b to the first port of an internal reservoir 54b. The high-pressure conduit 50b is connected through a below-described linear control valve 56b to the brake hydraulic control conduit 42b. The second port of the internal reservoir 54b is connected though a cut valve 58b to the brake hydraulic control conduit 42b.

The pump 46a can draw up the working liquid from the internal reservoir 54a and discharge the working liquid in the two following directions: the direction of increasing the hydraulic pressure in a wheel cylinder 60FL of the front left wheel and a wheel cylinder 60FR of the front right wheel (referred to hereinbelow as "pressure increase direction") and the direction of accumulating the working liquid from the master cylinder 14 or the wheel cylinders 60FL, 60FR in the internal reservoir 54a (referred to hereinbelow as "accumulation direction"). The pump 46b can draw up the working liquid from the internal reservoir 54b and discharge the working liquid in the two following directions: the direction of increasing the hydraulic pressure in a wheel cylinder 60RR of the rear right wheel and a wheel cylinder 60RL of the rear left wheel (referred to hereinbelow as "pressure increase direction") and the direction of accumulating the working liquid from the master cylinder 14 or the wheel cylinders 60RR, 60RL in the internal reservoir 54b (referred to hereinbelow as "accumulation direction"). For example, gear pumps can be used as such pumps capable of discharging the working liquid in two directions.

Hereinbelow, "pump 46" is used, as appropriate, as a collective term for the pumps 46a, 46b, and "internal reservoir 54" is used, as appropriate, as a collective term for the internal reservoirs 54a, 54b. Further, "high-pressure conduit 50" is used, as appropriate, as a collective term for the high-pressure conduits 50a, 50b, "brake hydraulic control conduit 42" is used, as appropriate, as a collective term for the brake hydraulic control conduits 42a, 42b, and "linear control valve 56" is used, as appropriate, as a collective term for the linear control valves 56a, 56b. Further, "wheel cylinder 60" is used, as appropriate, as a collective term for the wheel cylinders 60FL, 60FR, 60RL, 60RR.

The pump 46 is driven by a motor 62. As a result of the motor 62 being driven in a predetermined first direction, the pump 46 is driven to discharge the working liquid in the pressure increase direction (the rotation state of the pump 46 in this case is referred to as direct rotation). As a result of the motor 62 being rotated in the second direction opposite to the first direction, the pump 46 is driven to discharge the working liquid in the accumulation direction (the rotation state of the pump 46 in this case is referred to as reverse rotation).

During the direct rotation of the pump 46, the working liquid accumulated in the internal reservoir 54 is drawn up and discharged-supplied to the high-pressure conduit 50. During the reverse rotation of the pump 46, the working liquid from the master cylinder 14 or the wheel cylinder 60 is accumulated in the internal reservoir 54.

The linear control valve 56a and a check valve 64a are provided between the brake hydraulic control conduit 42a for the front left wheel and front right wheel and the high-pressure conduit 50a. The linear control valve 56a is a normally-open electromagnetic flow rate control valve which is in the open state when not energized and in which the opening degree can be regulated, as necessary, by controlling the energizing amount. By regulating the opening degree of the linear control valve 56a, it is possible to create a difference in pressure between the hydraulic pressure in the brake hydraulic control conduit 42a and the hydraulic pressure in the high-pressure conduit 50a, that is, between the positions before and after the linear control valve 56a.

Likewise, the linear control valve 56b and a check valve 64b are provided between the brake hydraulic control conduit 42b for the rear right wheel and rear left wheel and the high-pressure conduit 50b. The linear control valve 56b is a normally-open electromagnetic flow rate control valve which is in the open state when not energized and in which the opening degree can be regulated, as necessary, by controlling the energizing amount. By regulating the opening degree of the linear control valve 56b, it is possible to create a difference in pressure between the hydraulic pressure in the brake hydraulic control conduit 42b and the hydraulic pressure in the high-pressure conduit 50b, that is, between the positions before and after the linear control valve 56b.

A return conduit 66a for the front left wheel and front right wheel is connected to the supply conduit 52a for the front left wheel and front right wheel, and a connection conduit 68FL for the front left wheel and a connection conduit 68FR for the front right wheel are connected between the return conduit 66a and the high-pressure conduit 50a. A pressure-increasing valve 70FL, which is a normally-open solenoid valve, and a pressure-reducing valve 72FL, which is a normally-closed solenoid valve, are provided in the connection conduit 68FL, and a pressure-increasing valve 70FR, which is a normally-open solenoid valve, and a pressure-reducing valve 72FR, which is a normally-closed solenoid valve, are provided in the connection conduit 68FR.

The connection conduit 68FL located between the pressure-increasing valve 70FL and the pressure-reducing valve 72FL is connected by the connection conduit 74FL to the wheel cylinder 60FL of the front left wheel, and a check vale 76FL which allows the working liquid to flow only from the wheel cylinder 60FL toward the high-pressure conduit 50a is provided between the connection conduit 74FL and the high-pressure conduit 50a.

Likewise, the connection conduit 68FR located between the pressure-increasing valve 70FR and the pressure-reducing valve 72FR is connected by the connection conduit 74FR to the wheel cylinder 60FR of the front right wheel, and a check vale 76FR which allows the working liquid to flow only from the wheel cylinder 60FR toward the high-pressure conduit 50a is provided between the connection conduit 74FR and the high-pressure conduit 50a.

Similarly to the configuration relating to the front left wheel and front right wheel, a return conduit 66b for the rear right wheel and rear left wheel is connected to the internal reservoir 54b for the rear right wheel and rear left wheel, and a connection conduit 68RL for the rear left wheel and a connection conduit 68RR for the rear right wheel are connected between the return conduit 66b and the high-pressure conduit 50b. A pressure-increasing valve 70RL, which is a normally-open solenoid valve, and a pressure-reducing valve 72RL, which is a normally-closed solenoid valve are provided in the connection conduit 68RL, and a pressure-increasing valve 70RR, which is a normally-open solenoid valve, and a pressure-reducing valve 72RR, which is a normally-closed solenoid valve, are provided in the connection conduit 68RR.

The connection conduit 68RL located between the pressure-increasing valve 70RL and the pressure-reducing valve 72RR is connected by the connection conduit 74RL to the wheel cylinder 60RL of the rear left wheel, and a check vale 76RL which allows the working liquid to flow only from the wheel cylinder 60RL toward the high-pressure conduit 50b is provided between the connection conduit 74RL and the high-pressure conduit 50b. Likewise, the connection conduit 68RR located between the pressure-increasing valve TORR and the pressure-reducing valve 72RR is connected by the connection conduit 74RR to the wheel cylinder 60RR of the rear right wheel, and a check vale 76RR which allows the working liquid to flow only from the wheel cylinder 60RR toward the high-pressure conduit 50b is provided between the connection conduit 74RR and the high-pressure conduit 50b.

Hereinbelow, "pressure-increasing valve 70" is used, as appropriate, as a collective term for the pressure-increasing valves 70FL, 70FR, 70RL, 70RR, and "pressure-reducing valve 72" is used, as appropriate, as a collective term for the pressure-reducing valves 72FL, 72FR, 72RL, 72RR. Further, "return conduit 66" is used, as appropriate, as a collective term for the return conduits 66a, 66b, and "connection conduit 74" is used, as appropriate, as a collective term for the connection conduits 74FL, 74FR, 74RL, 74RR.

A disk brake unit functioning as a hydraulic brake device is provided for each wheel of the vehicle, and each disk brake unit generates a hydraulic braking force when a brake pad is pressed against a disk by hydraulic drive of the wheel cylinder 60. Further, the disk brake units for the rear left and right wheels contain an electric parking brake device. The electric parking brake device uses an electric motor as a drive force, moves a nut member contained in the wheel cylinder 60 and presses the brake pad against the disk, thereby generating the a parking braking force. The disk brake unit is explained below in greater detail.

Wheel cylinder pressure sensors 78FL, 78FR, 78RL, 78RR, which detect the wheel cylinder pressure, are provided close to the wheel cylinders 60FL, 60FR, 60RL, 60RR for the front left wheel, front right wheel, rear left wheel and rear right wheel. Hereinbelow, "wheel cylinder pressure sensor 78" is used, as appropriate, as a collective term for the wheel cylinder pressure sensors 78FL, 78FR, 78RL, 78RR.

Further, the front left wheel, front right wheel, rear left wheel, and rear right wheel are provided with wheel speed sensors 80FL, 80FR, 80RL, 80RR that detect the wheel speed of the respective wheels. Hereinbelow, "wheel speed sensor 80" is used, as appropriate, as a collective term for the wheel speed sensors. 80FL, 80FR, 80RL, 80RR.

The above-described linear control valve 56, pressure-increasing valve 70, pressure-reducing valve 72, and pump 46 constitute a hydraulic actuator 82 of the brake system 10. This hydraulic actuator 82 is controlled by an electronic control unit (referred to hereinbelow as "ECU") 84 functioning as a controller.

The ECU 84 includes a central processing unit (CPU) executing various types of computational processing, a read only memory (ROM) storing various control programs, a random access memory (RAM) used as a work area for data storage or program execution, a nonvolatile memory such as a backup RAM capable of holding the stored contents even when the engine is stopped, an input/output interface, an analog-to-digital (A/D) converter for converting analog signals inputted from various sensors into digital signals and taking in the digital signals, and a timer for measuring time.

Various actuators including the hydraulic actuator 82 such as the above-described linear control valve 56, pressure-increasing valve 70, pressure-reducing valve 72, and motor 62 are electrically connected to the ECU 84.

Further, various sensors and switches that output signals used for the control are electrically connected to the ECU 84. Thus, a signal indicating a wheel cylinder pressure in the wheel cylinder 60 is inputted from the wheel cylinder pressure sensor 78 into the ECU 84.

The ECU 84 also inputs signals indicating the wheel speed of the wheels from the wheel speed sensor 80, a signal indicating a yaw rate from a yaw rate sensor, a signal indicating the steering angle of a steering wheel from a steering angle sensor, and a signal indicating the running speed of the vehicle from a vehicle speed sensor.

The ECU 84 also inputs a signal indicating a master cylinder pressure from a master cylinder pressure sensor 86, and a signal (braking request signal from the driver) indicating whether or not the brake switch 44 is in the ON state from the brake switch. The ECU 84 also inputs a signal from a sensor detecting the high-pressure conduit pressure (not shown in the figure) and calculates the difference in pressure between the zones before and after the linear control valve 56 from the master cylinder pressure and high-pressure conduit pressure.

In the brake system 10 of such a configuration, when the vehicle runs in a usual running state, the linear control valve 56 is open, the pressure-increasing valve 70 is open, the pressure-reducing valve 72 is closed, an oil pressure equal to the master cylinder pressure generated when the driver depresses the brake pedal 12 is generated in the wheel cylinder, and a braking force is generated.

The brake system 10 also has a function of monitoring the running state of the vehicle on the basis of the signals from the sensors connected to the ECU 84 and controlling the pump 48 and the linear control valve 56 according to the running state of the vehicle, thereby generating the optimum braking force automatically. Examples of such automatic braking force control include traction control (TRC) and side skid inhibiting control (vehicle stability control (VSC)). Further, the so-called adaptive cruise control (ACC) can be used in which the state in front of the host vehicle, for example, the running state of the vehicle ahead, is recognized with a laser or radar, and adaptive running and braking are executed automatically in the entire speed range. In addition, the so-called brake hold (BH) in which the braking state reached when the vehicle is stopped is maintained is also included in the automatic braking force control. Those types of control are commonly used and detailed explanation thereof is herein omitted.

Figure 2:
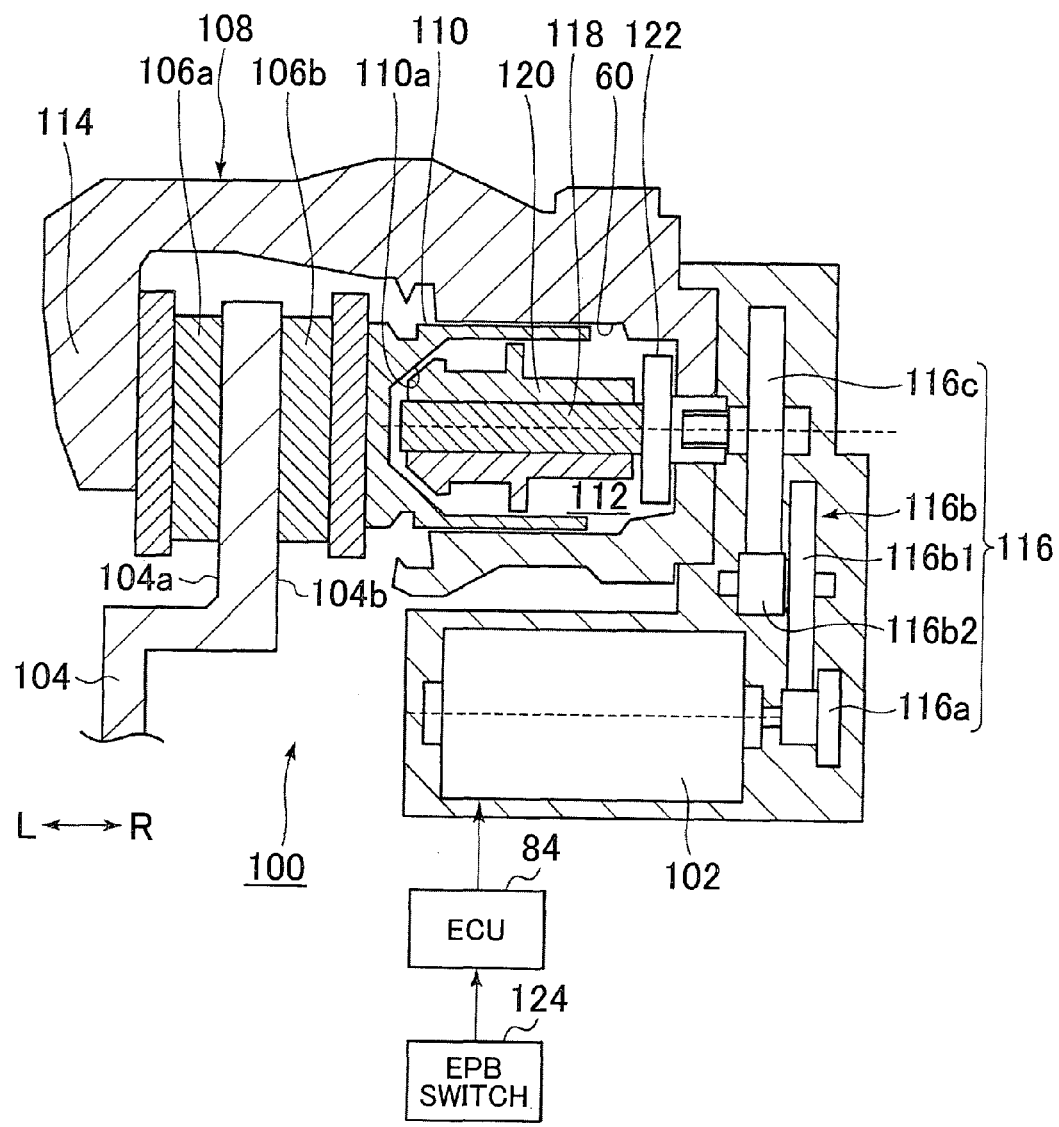
FIG. 2 is an explanatory drawing illustrating a structural example of the disk brake unit in which an electric parking brake device is integrated with a disk brake unit and which can be used in the brake systems of the embodiments.

FIG. 2 is a cross-sectional view of part of the disk brake unit 100 in which an electric parking brake device is integrated with a disk brake unit and which can be used in the brake system 10 shown in FIG. 1. The disk brake unit 100 has a function of actuating the piston by the hydraulic pressure generated from the master cylinder 14 and generating the hydraulic braking force and a function of actuating the piston by an electric motor 102 and generating the parking braking force.

The disk brake unit 100 includes a disk rotor 104 rotating together with the wheels (not shown in the figure), brake pads 106a, 106b as friction members, and a caliper 108 that moves the brake pads.

The wheel cylinder 60 is formed inside the caliper 108, and a piston 110 is slidably disposed inside the wheel cylinder 60. A hydraulic pressure generating chamber 112 for hydraulic braking force control is also formed inside the wheel cylinder 60, and the hydraulic pressure generating chamber 112 communicates with the master cylinder 14 (see FIG. 1) through a passage (not shown in the figure).

The pair of brake pads 106a, 106b is disposed opposite friction sliding surfaces 104a, 104b, respectively, on both sides of the disk rotor 104, and supported to be capable of sliding in the axial direction of the disk rotor 104. A hook 114 projecting from the caliper 108 is disposed on the back side of the brake pad 106a. The piston 110 is mounted on the back side of the brake pad 106b.

The electric motor 102 is installed inside the disk brake unit 100. The electric motor 102 functions as drive means for pressing the brake pads 106a, 106b against the disk rotor 104 when the parking brake is actuated and separating the brake pads 106a, 106b from the disk rotor 104 when the parking brake is deactivated.

The electric motor 102 drives the piston 110 through a reducer 116. A pinion 116a is mounted on the output shaft of the electric motor 102, and the pinion 116a meshes with a large-diameter gear 116b1 of a stepped first gear 116b. A small-diameter gear 116b2 of the first gear 116b meshes with a second gear 116c. The central shaft of the second gear 116c is joined to a screw shaft 118 extending in the left-right direction inside the wheel cylinder 60.

The piston 110 has a substantially cylindrical shape open at one side, and a lock nut 120 supported to be axially slidable and non-rotatable with respect to the piston 110 is inserted from the open end of the piston 110. The lock nut 120 has a substantially cylindrical shape, a screw groove is formed at the inner surface thereof, and a screw shaft 118 is screwed into the screw groove. With such a structure, the rotational movement transmitted from the electric motor 102 can be converted into the linear movement of the lock nut 120.

At the reducer side of the screw shaft 118, an enlarged-diameter portion 122 is formed. A thrust bearing (not shown in the figure) is disposed between the enlarged-diameter portion 122 and the caliper 108, and the bearing can receive the axial force of the screw shaft.

For example, when the driver depresses the brake pedal 12 during the usual hydraulic braking force control, the liquid pressure from the master cylinder 14 is introduced into the hydraulic pressure generating chamber 112, the pressure inside the hydraulic pressure generating chamber 112 rises, the piston 110 is moved in the direction shown by an arrow L in FIG. 2, and the brake pad 106b is pressed against the friction sliding surface 104b of the disk rotor 104. Where the hydraulic pressure is additionally introduced into the hydraulic pressure generating chamber 112 in this state and the pressure inside the hydraulic pressure generating chamber 112 further rises, the caliper 108 itself moves in the direction shown by an arrow R in the figure. As a result, the hook 114 moving integrally with the caliper 108 is pressed against the back surface of the brake pad 106a, and the brake pad 106a is pressed against the friction sliding surface 104a of the disk rotor 104. In other words, the disk rotor 104 is squeezed by the pair of brake pads 106a, 106b, and a friction braking force (hydraulic braking force) is generated.

An electric parking brake (EPB) switch 124 which is operated by the driver is disposed inside the vehicle cabin. Where the EPB switch 124 is set ON, a drive signal is sent from the ECU 84 to the electric motor 102. The rotation of the electric motor 102 is transmitted through the reducer 116 to the screw shaft 118 and then converted into the linear movement of the lock nut 120 in the direction shown by the arrow L in the figure. As a result of such linear movement, the lock nut 120 abuts against an inner wall surface 110a of the piston 110, and the brake pad 106b fixed to the tip of the piston 110 is pressed against the friction sliding surface 104b of the disk rotor 104. In this case, the caliper 108 is moved to the right (direction shown by the arrow R), which is the direction opposite to the movement direction of the piston 110, by the counterforce of the piston 110, and the brake pad 106a is pressed against the friction sliding surface 104a of the disk rotor 104, in the same manner as during the hydraulic braking, by the hook 114 at the tip of the caliper 108. As a result, the disk rotor 104 is squeezed by the pair of brake pads 106a, 106b, whereby the wheels are fixed and the parking brake function is demonstrated.

When the disk rotor 104 is squeezed by the pair of brake pads 106a, 106b driven by the electric motor 102, since the lock nut 120 does not move even when the supply of electric power to the electric motor 102 is cut off, the squeezed state, that is, the parking brake state, can be maintained. When the parking brake state is canceled, the electric motor 102 may be rotated in reverse and the lock nut 120 may be withdrawn back in the direction shown by the arrow R. When a predetermined stopping condition is fulfilled, e.g. when the vehicle has been stopped and a predetermined period has elapsed, for example, 3 min have elapsed after the vehicle has been stopped, the ECU 84 drives the electric motor 102 and generates a parking braking force, regardless of the control signal from the EPB switch 124. Thus, the stopping state of the vehicle is maintained. The feature of maintaining the braking force when a predetermined condition is fulfilled is the so-called BH. The BH control can be also executed by controlling each control valve and generating the hydraulic braking force during the hydraulic braking force control. However, where the time elapsed before switching to the electric parking brake devices is set too short in the BH state after the vehicle has been stopped, the electric parking brake devices can be unnecessarily actuated, the number of drive cycles of the electric motor 102 can be increased, and battery power can be wasted when the vehicle is repeatedly stopped and started, for example, as in traffic congestion. Therefore, it is desirable that the time elapsed before switching to the electric parking brake devices could be changed, as appropriate, in the BH state after the vehicle has been stopped, and a value of the elapsed time with a low power consumption be set by comparing the power consumption of the battery in the hydraulic braking and when the electric motor 102 is driven.

Explained below in specific detail is the case in which the automatic braking force control is cooperatively performed for the hydraulic brake devices and electric parking brake devices by using the brake system 10 and the disk brake unit 100 configured as described hereinabove. In the below-described embodiments, an example of brake system configuration is shown in which a vehicle of the four-wheel configuration shown in FIG. 1 is used, a hydraulic brake device (for example, a disk brake device) is mounted on each of the four wheels, and an electric parking brake device is mounted on each of the two rear wheels.

First Embodiment

The first embodiment is explained below with reference to FIGS. 3 to 6. In the first embodiment, the case is considered in which the automatic maintenance control of the braking force, that is, the so-called BH, is performed as automatic braking force control when the vehicle is stopped. The BH also includes the case in which the braking force is maintained as a result of the ACC control. When the usual ACC is performed, brake control is executed with respect to all wheels. Where a predetermined period of time elapses after the vehicle has been stopped, the electric parking brake devices are automatically actuated and switched to parking brake control. In this case, for example, the switching is performed from four-wheel braking to two-wheel braking of the wheels on which the electric parking brake devices have been mounted. As mentioned hereinabove, in some cases, a switching shock (vibrations) caused by a change in the number of the braked wheels and a change in the braking method can occur. Further, where the driver depresses the brake pedal 12 during the automatic braking force control based on hydraulic control, the working liquid cannot sufficiently flow into the wheel cylinder 60. Therefore, the stroke of the brake pedal 12 is made difficult and the driver may feel uncomfortable.

Figure 3:
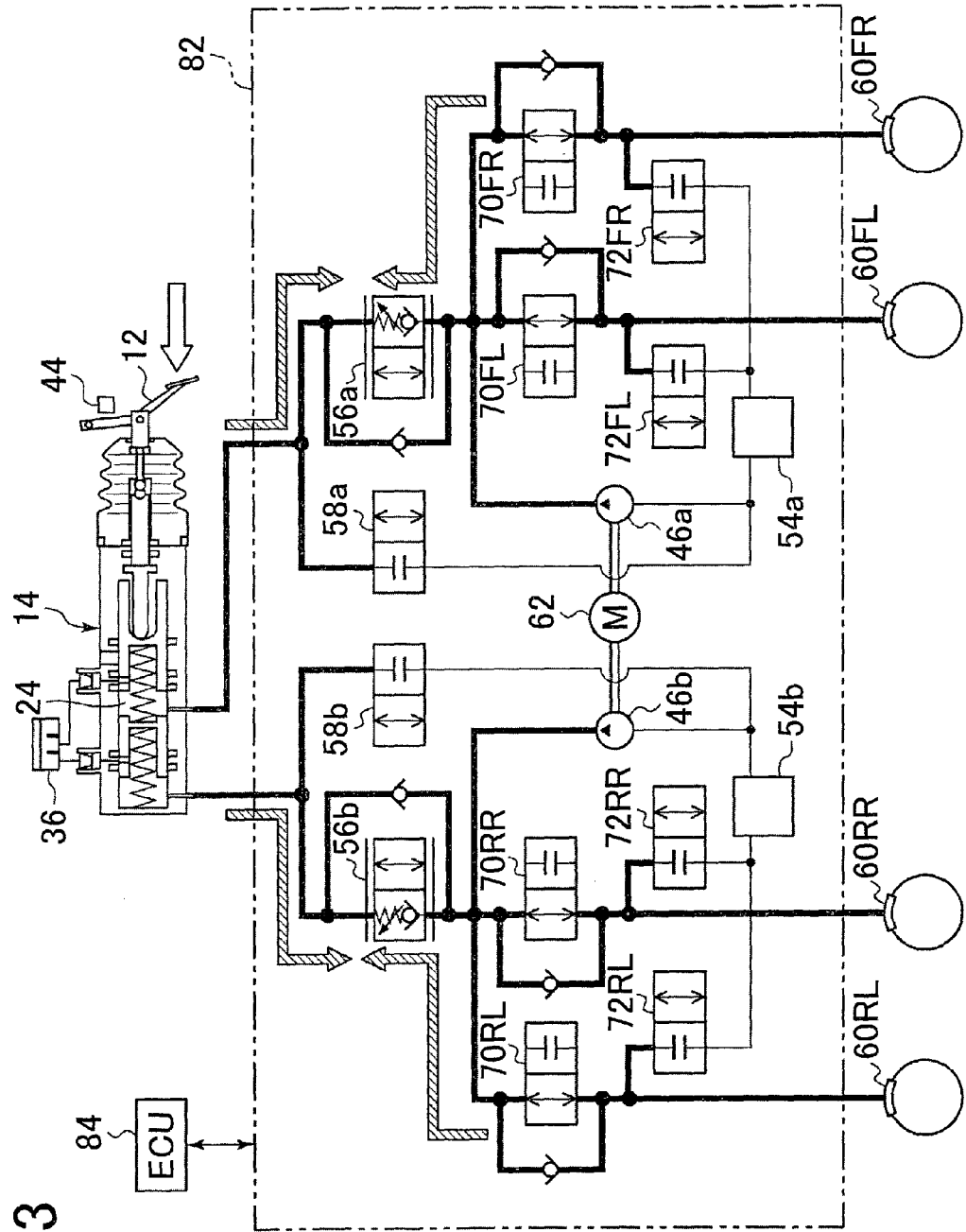
FIG. 3 is an explanatory drawing illustrating the hydraulic pressure state in the first embodiment.

FIG. 3 shows the hydraulic pressure state attained when the brake system 10 executes the automatic braking force control. When the automatic braking force control is executed, the ECU 84 drives the motor 62 and causes the pumps 46a, 46b to discharge the working liquid in a state in which the linear control valves 56a, 56b are closed, the pressure-increasing valves 70FL to 70RR are open, and the pressure-reducing valves 72FL to 72RR are closed. As a result, the hydraulic pressure is supplied to the wheel cylinders 60 FL to 60 RR, and the hydraulic braking force control is possible regardless of the braking request operation performed by the driver. In other words, the ACC control can be executed, or the BH state can be formed. In FIG. 3, portions of the conduits shown by bold lines are in a high-pressure state.

For example, where the driver depresses the brake pedal 12 during the BH in the state shown in FIG. 3, the ECU 84 performs valve opening control of the linear control valves 56a, 56b on the basis of the signal from the brake switch 44, but since the conduits leading from the linear control valves 56a, 56b on the wheel cylinder 60 side are in a high-pressure state, the hydraulic pressure counteracts, the working liquid cannot be discharged from the master cylinder 14, and the stroke of the brake pedal 12 is made difficult. In other words, the operation feeling of the brake pedal 12 is degraded.

In the first embodiment, a control example is shown that relates to the case in which the depression of the brake pedal 12 is detected when the vehicle is stopped, for example, in traffic congestion, and the BH control is executed during the ACC control. In the first embodiment, the operation of the brake pedal 12 is taken as an opportunity for starting the control, but a condition that the vehicle speed is equal to zero is taken as the predetermined speed condition in the automatic baking force control. In this case, for example, the hydraulic pressure in the wheel cylinders 60FL, 60FR on the front wheel side is reduced to enable the reception of hydraulic pressure from the master cylinder 14. In other words, a transition is made from the hydraulic braking force control of all of the wheels to the hydraulic braking force control of the wheels on which the electric parking brake devices have been mounted. More specifically, as a shown in FIG. 4, where a signal from the brake switch 44 is acquired during the hydraulic braking force control of all of the wheels, the ECU 84 stops the pump 46a, opens the pressure-reducing valves 72FL, 72FR and temporarily transfers the working liquid from the wheel cylinders 60FL, 60FR into the internal reservoir 54a before the linear control valves 56a, 56b are controlled to be open. In other words, a transition is made from the hydraulic braking force control of all of the wheels (four wheels) to the hydraulic braking force control of two wheels as the automatic braking force control. The transfer of the working liquid into the internal reservoir 54a is preferably executed before the brake pedal 12 actually starts delivering the working liquid located inside the master cylinder 14. Therefore, it is desirable that the ECU 84 open the pressure-reducing valves 72FL, 72FR at the initial stage of depression of the brake pedal 12, for example, within the "play" range of the stroke of the brake pedal 12. The ECU 84 closes the pressure-reducing valves 72FL, 72FR once the reduction of pressure in the wheel cylinders 60FL, 60FR has been completed.

Figure 5:
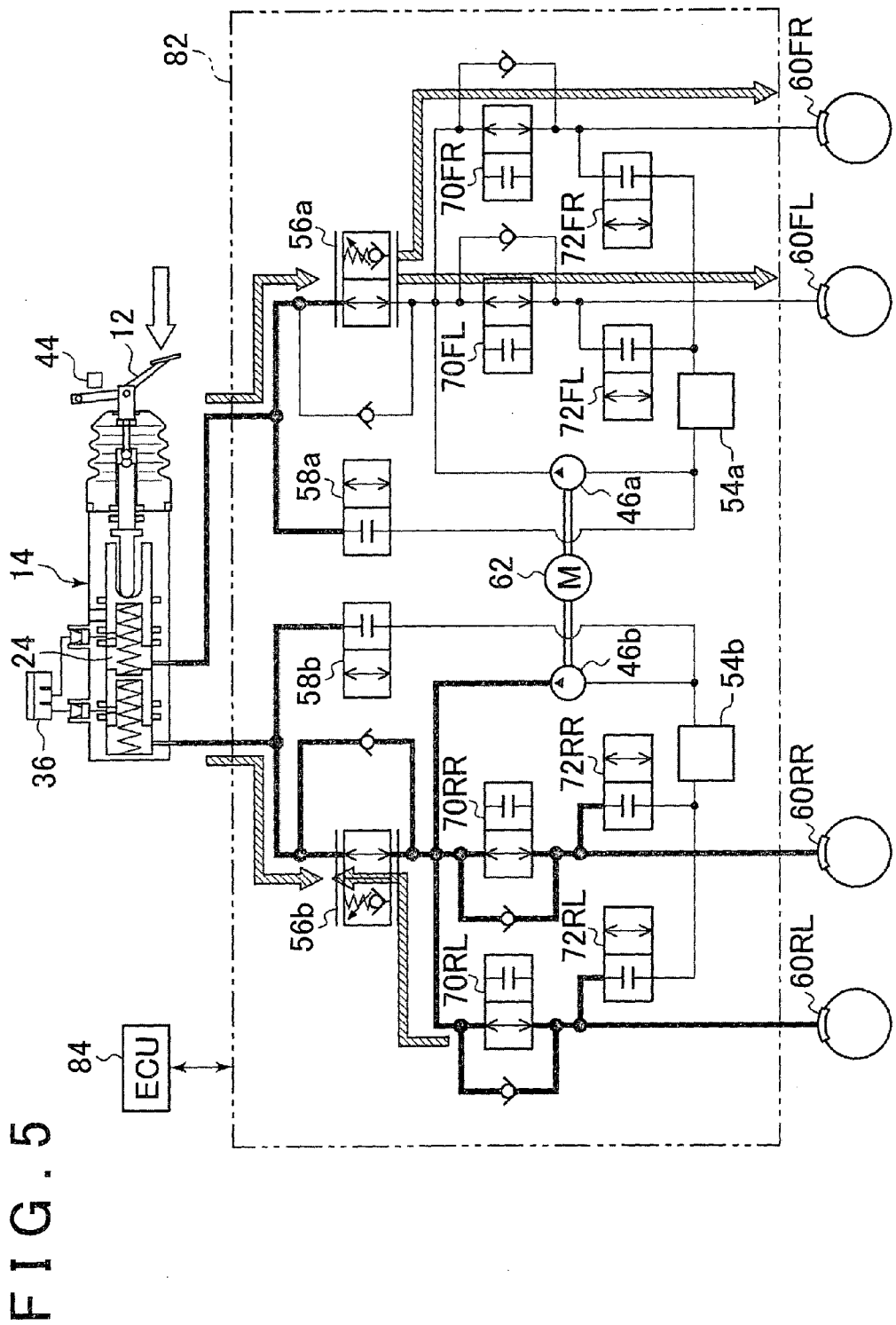
FIG. 5 is an explanatory drawing illustrating the hydraulic pressure state in the first embodiment.

As shown in FIG. 5, since the pressure in the wheel cylinders 60FL, 60FR is reduced, even when the brake pedal 12 is depressed and the working liquid is delivered from the master cylinder 14, this working liquid can flow into the wheel cylinders 60FL, 60FR. Meanwhile, since the valve opening of the pressure-reducing valves 72RL, 72RR is not performed, the hydraulic state of the wheel cylinders 60RL, 60RR is the same as that shown in FIG. 3, and a braking force is generated. Where the brake pedal 12 is depressed in such a state, the working liquid from the first liquid chamber 24 can flow into the wheel cylinders 60FL, 60FR through the linear control valve 56a and the pressure-increasing valves 70FR, 70FL. As a result, the stroke of the brake pedal 12 is facilitated and the operation feeling of the brake pedal 12 can be improved even during the automatic braking force control. Since the closed state of the pressure-reducing valves 72RL, 72RR is maintained, the braking force on the rear wheel side is ensured. Further, on the front wheel side, the pressure is reduced as the automatic braking force control, but since the braking force is generated by the working liquid supply from the master cylinder 14, although the braking force for the entire vehicle changes, the change thereof is minor and a sufficient braking force can be ensured.

As a result of such a transition from the hydraulic braking force control of all of the wheels (four wheels) to the hydraulic braking force control of two wheels during the automatic braking force control, when the hydraulic braking force control is switched to braking with the electric parking brake devices after the vehicle has been stopped, the two-wheel braking by the hydraulic pressure is switched to the two-wheel braking by the electric parking brake devices, for example, after 3 min elapse since the vehicle has been stopped. In other words, the number of the braked wheels is not changed during the switching. As a result, the occurrence of vibrations such as a switching shock or a change in posture in the braking method can be inhibited. Further, the working liquid that has been transferred to the internal reservoir 54a is returned into the master cylinder reservoir 36 or the first liquid chamber 24 of the master cylinder 14 by opening the cut valve 58a, for example, when the automatic braking force control is not executed.

Figure 6:
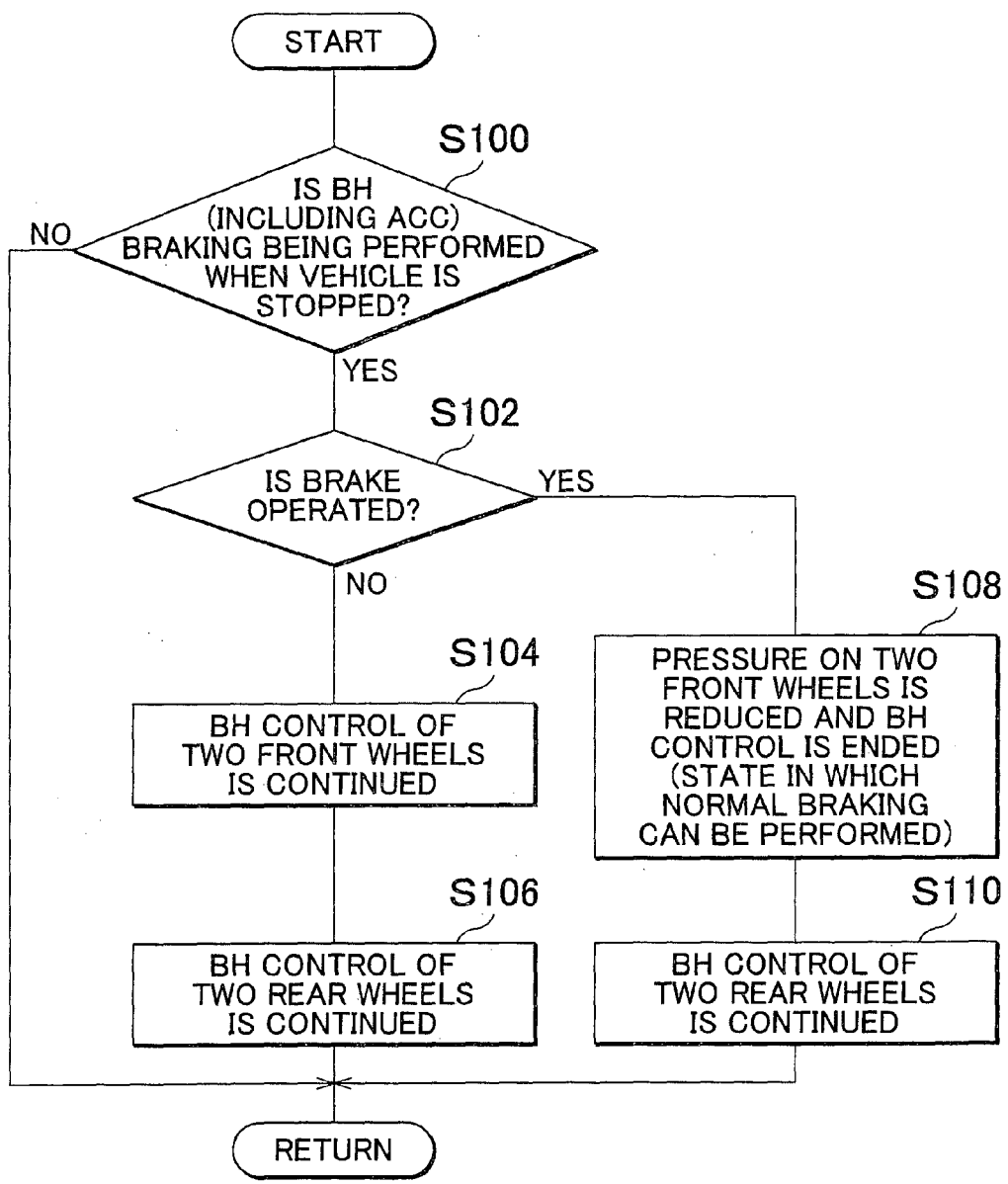
FIG. 6 is a flowchart illustrating the hydraulic braking state in the first embodiment.

FIG. 6 is a flowchart illustrating the processing performed in the ECU 84 of the first embodiment. When the ignition switch of the vehicle is ON, or in a state similar thereto, the ECU 84 repeatedly executes the processing shown in FIG. 6 with a predetermined period.

When the BH (including also the implementation of the ACC control) braking is not being performed when the vehicle is stopped, in other words, when the automatic braking force control is not being performed (No in S100), the ECU 84 returns to the beginning of the flowchart to wait for the next processing timing. When it is determined in step S100 that the vehicle is stopped, that is, the condition that the vehicle speed is equal to zero is fulfilled as the predetermined speed condition, and it is determined that the BH braking is being performed (Yes in S100), where the brake pedal 12 is not operated (No in S102), the automatic braking force maintenance (BH) control of the two front wheels is continued (S104) and the automatic braking force maintenance (BH) control of the two rear wheels is also continued (S106). In other words, the BH control is continued by the hydraulic braking force control of four wheels, and a return is made to the beginning of the flowchart for the processing of the next period.

Figure 4:
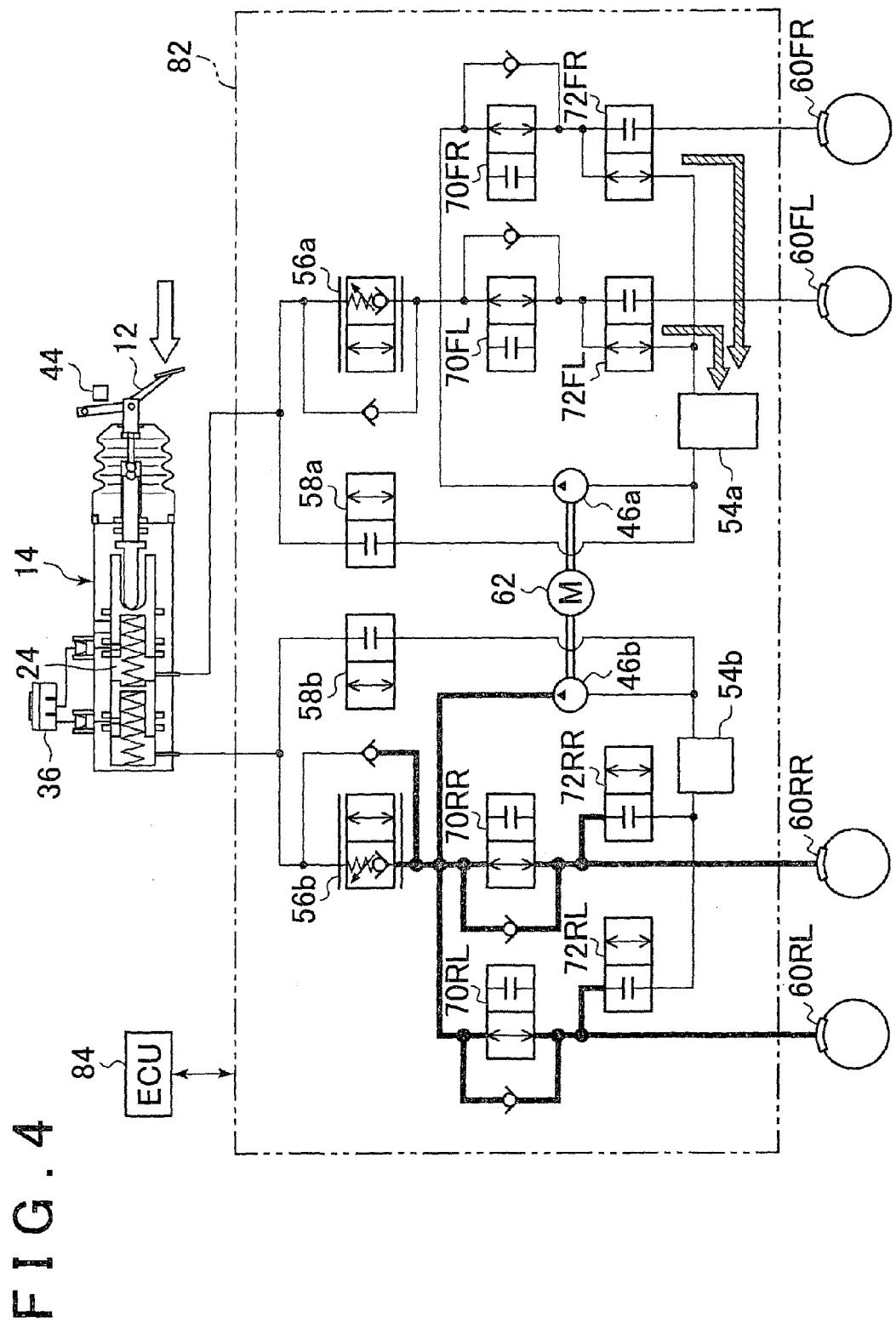
FIG. 4 is an explanatory drawing illustrating the hydraulic pressure state in the first embodiment.

Meanwhile, where it is detected that the brake pedal 12 has been operated during the BH control (Yes in S102), the ECU 84 transfers the working liquid of the two wheels on the front wheel side into the internal reservoir 54a and reduces the pressure in the wheel cylinders 60FL, 60FR, as explained with reference to FIG. 4. In other words, the BH control of the front wheel side is ended and the state in which the usual braking is possible is reached (S108). As for the rear wheel side, the hydraulic pressure state of the wheel cylinders 60RL, 60RR is held, the BH control is maintained (S110), and a return is made to the beginning of the flowchart for the processing of the next period.

By performing such processing, it is possible to inhibit the driver from being imparted with an uncomfortable feeling such as a difficult stroke of the brake pedal 12 even when the brake pedal 12 is depressed when the vehicle is stopped in the course of the automatic braking force control. Further, in the above-described example, it is made possible to receive the working liquid from the master cylinder 14 by reducing the pressure in the wheel cylinders 60FL, 60FR on the front wheel side, which are the wheels on which the electric parking brake devices are not mounted, but where the objective is to improve the operation feeling of the brake pedal 12, the pressure reducing control may be performed at least on one wheel among all of the wheels. For example, the same effect can be obtained by reducing the pressure in the wheel cylinders 60RL, 60RR on the rear wheel side. Typically, the brake devices on the front wheel side in most cases have a higher braking capacity. Therefore, when the vehicle run is immediately restarted without using the electric parking brake devices, as when the vehicle is stopped in the traffic congestion, it can be better to maintain the stopping state on the front wheel side where a large braking force can be ensured. For example, the vehicle can be easily inhibited from sliding down when stopped on a slope. Further, as another example, pressure reduction may be performed in a combination of some of the wheels on which the electric parking brake devices are mounted and some of the wheels on which such devices are not mounted. In this case, the range for selecting the wheels to be reduced in pressure is expanded and the degree of freedom in control can be increased.

Further, as described hereinabove, since the number of the wheels that are the object of the hydraulic braking force control is changed (changed from 4 wheels to 2 wheels) after the vehicle has completely stopped, the execution of the transitional control of the hydraulic braking force control performed automatically can be made hardly noticeable to the vehicle occupants. Further, changes in the vehicle behavior caused by the transitional control are inhibited.

In the flowchart shown in FIG. 6, where the BH state (stop holding state) is continued for a predetermined period of time, for example, where 3 min elapse after the vehicle has been stopped, switching is performed to the operation control of the electric parking brake devices, and the hydraulic braking force control is canceled. In the case of the electric parking brake device, the electric motor 102 is driven only when the electric parking device is actuated, and after a braking force has been generated by the electric parking brake device, it is not necessary to drive the electric motor 102. In other words, after a braking force has been generated by the electric parking brake device, it is not necessary to drive the control valves of the hydraulic actuator 82 and it is also not necessary to drive the electric motor 102. Therefore, the consumption of battery power can be inhibited.

Second Embodiment

The second embodiment is explained below with reference to FIGS. 7 to 11. In the above-described first embodiment, the control is explained that is performed when a condition that the vehicle speed is equal to zero is fulfilled as the predetermined speed condition during the automatic braking force control, but in the second embodiment, an example is explained in which a control condition that a predetermined period of time has elapsed after the vehicle has been stopped is taken as the predetermined speed condition during the automatic braking force control.

Figure 7:
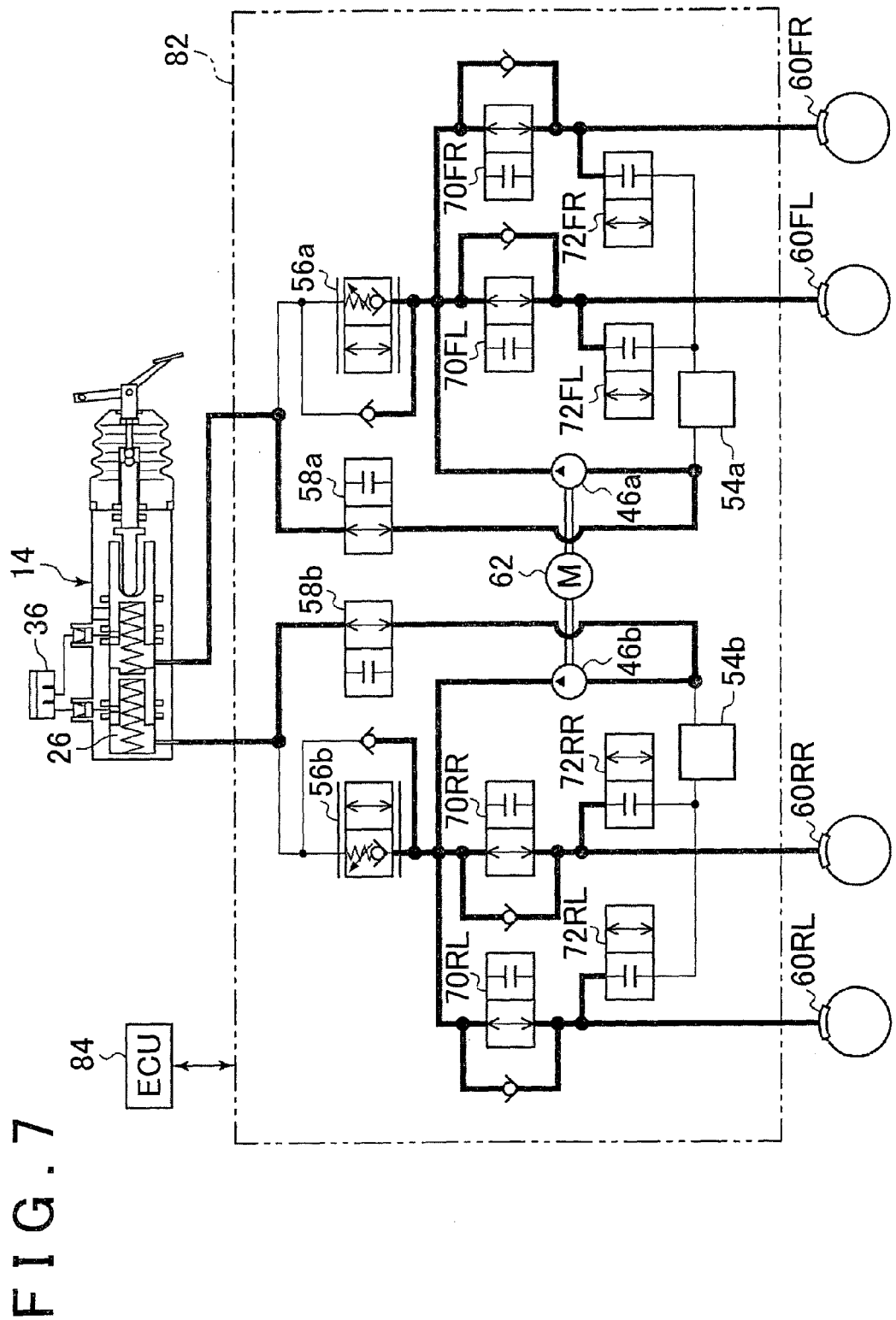
FIG. 7 is an explanatory drawing illustrating the hydraulic pressure state in the second and sixth embodiments.
Figure 8:
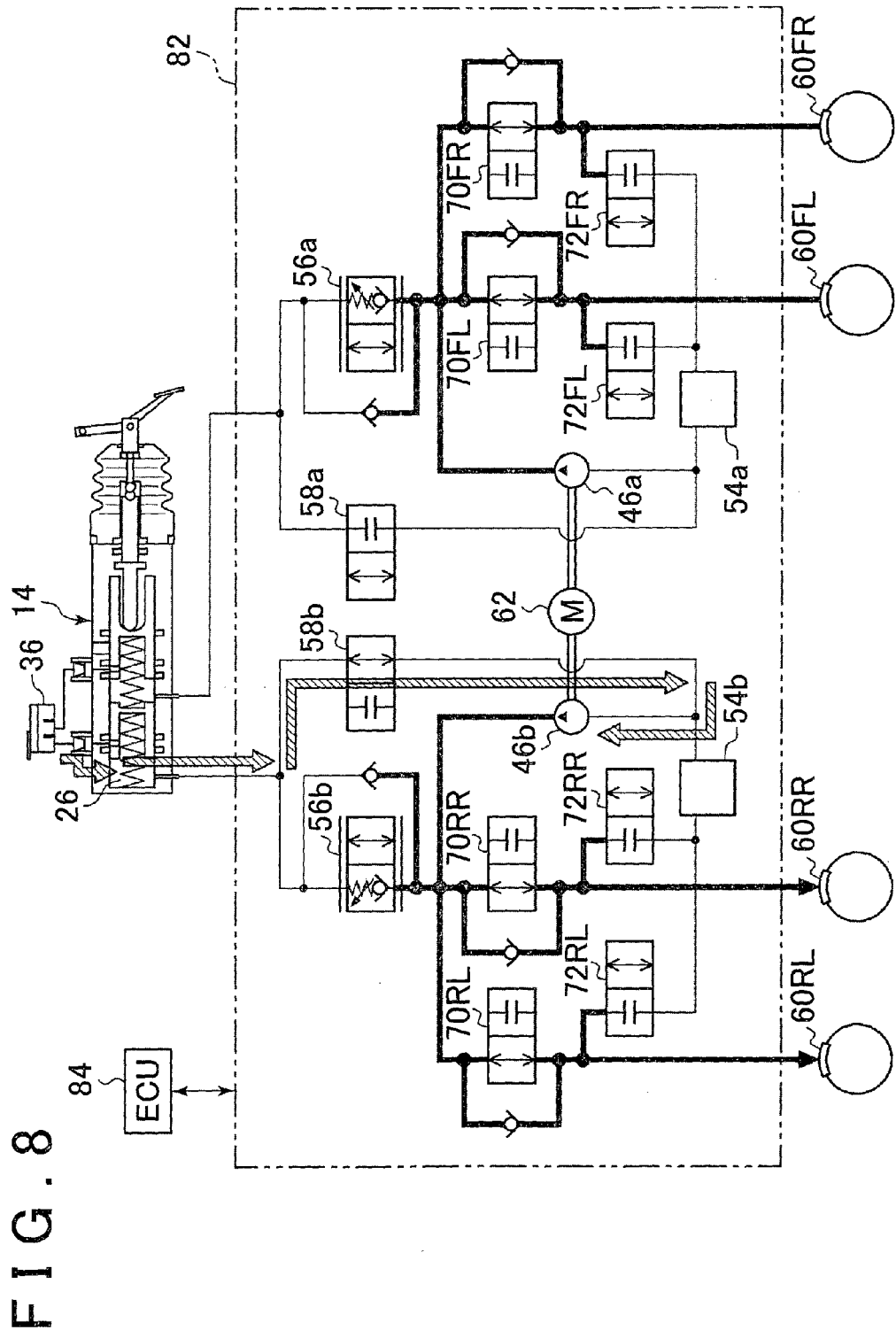
FIG. 8 is an explanatory drawing illustrating the hydraulic pressure state in the second and sixth embodiments.
Figure 9:
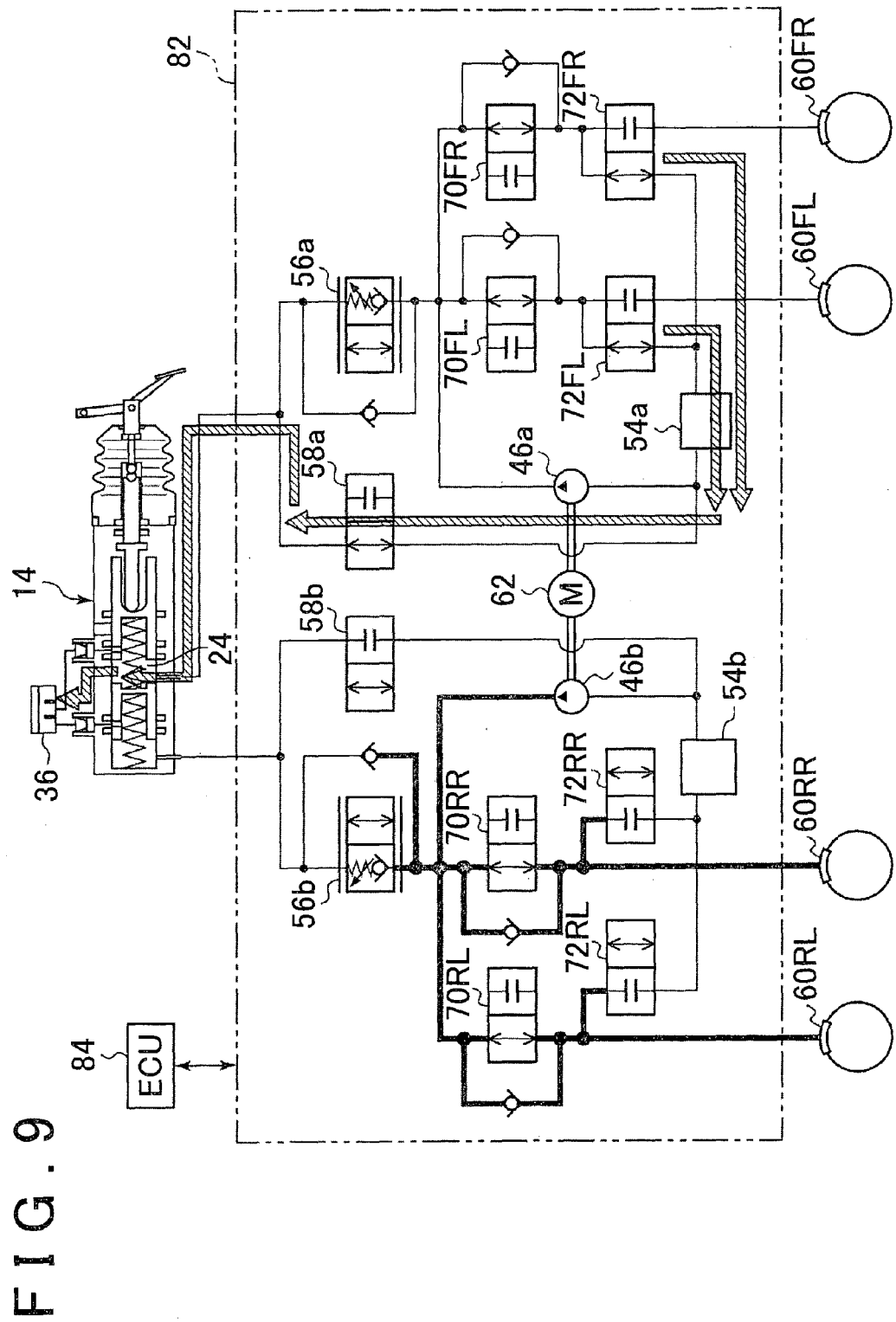
FIG. 9 is an explanatory drawing illustrating the hydraulic pressure state in the second and sixth embodiments.
Figure 10:
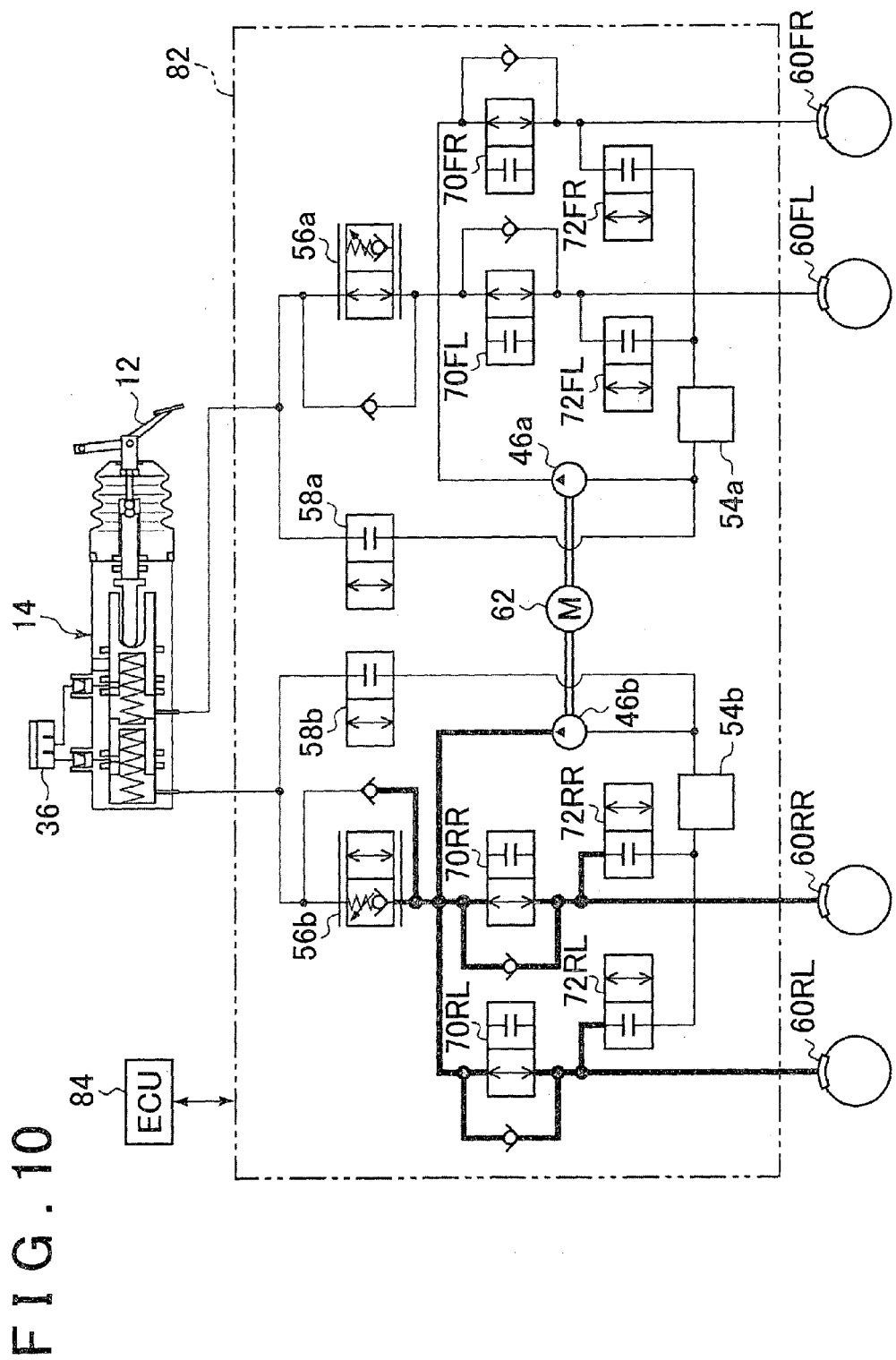
FIG. 10 is an explanatory drawing illustrating the hydraulic pressure state in the second and sixth embodiments.

FIG. 7 shows the hydraulic pressure state when the brake system 10 executes the automatic braking force control. This state is basically the same as the hydraulic pressure state shown in FIG. 3. When the automatic braking force control is executed, the ECU 84 drives the motor 62 and causes the pumps 46a, 46b to discharge the working liquid in a state in which the linear control valves 56a, 56b are closed, the pressure-increasing valves 70FL to 70RR are open, and the pressure-reducing valves 72FL to 72RR are closed. As a result, the hydraulic pressure is supplied to the wheel cylinders 60FL to 60RR, and the hydraulic braking force control can be performed regardless of the braking request operation performed by the driver. In other words, a state during automatic braking and stopping or during the automatic stopping control (including the time immediately before the vehicle is stopped) is demonstrated.

Where the BH control is continued for a long time in the state shown in FIG. 7, it results in undesirable heat generation in the driven control valves and consumption of drive power. Therefore, in the automatic braking force control, the hydraulic braking force control is switched to the braking by the electric parking brake devices once a predetermined period of time (for example, 3 min) elapses since the vehicle has been stopped. When such switching is performed, where the hydraulic braking force control of four wheels is directly switched to the braking by the electric parking brake devices of two wheels, as described hereinabove, a switching shock (vibrations) caused by a change in the number of the braked wheels or a change in the braking method can occur. Accordingly, in the second embodiment, pretreatment is performed when the electric parking brake devices are actuated.

Where a predetermined period of time (for example, 500 ms) elapses since the vehicle has been stopped, the ECU 84 makes a transition from the hydraulic braking force control of four wheels to the hydraulic braking force control of the wheels (two rear wheels) on which the electric parking brake devices have been mounted. More specifically, as shown in FIG. 8, the ECU 84 further supplies the hydraulic pressure that generates a braking force corresponding to the braking force generated on the front wheel side from the hydraulic pressure state shown in FIG. 7 into the wheel cylinders 60RL, 60RR on the rear wheel side. In other words, the cut valve 58b is opened and only the pump 46b is driven, and the working liquid contained in the master cylinder reservoir 36 is drawn up through the second liquid chamber 26. The working liquid is supplied to the wheel cylinders 60RL, 60RR to raise the pressure therein and increase the hydraulic braking force on the rear wheel side. Where the increase in pressure corresponding to the braking force on the front wheel side is completed, the ECU 84 closes the cut valve 58*b* and stops the pump 46*b*, and maintains the high-pressure state of the wheel cylinders 60RL, 60RR, as shown in FIG. 9. The ECU 84 then opens the pressure-reducing valves 72FL, 72FR and the cut valve 58*a* and returns the working liquid accumulated in the wheel cylinder 60FL, 60FR into the master cylinder reservoir 36 through the internal reservoir 54*a* and the first liquid chamber 24 of the master cylinder 14. In other words, a transition is made from the hydraulic braking force control of all of the wheels to the hydraulic braking force control of the wheels on which the electric parking brake devices have been mounted. Once the reduction of pressure in the wheel cylinders 60FL, 60FR has been completed, the ECU 84 closes the pressure-reducing valves 72FL, 72FR and the cut valve 58*a*, as shown in FIG. 10. As a result, the hydraulic braking pressure control is executed only for the two wheels on the rear wheel side.

Thus, by so increasing the hydraulic pressure on the rear wheel side, a transition is made from the hydraulic braking force control of all of the wheels (four wheels) to the hydraulic braking force control of two wheels, as automatic braking force control, while maintaining the braking force same as that during braking at all of the wheels as the braking force of the entire vehicle (total braking force). Then, where a predetermined period of time (for example, 3 min) elapses after the vehicle has been stopped and switching is performed from the hydraulic braking force control to the parking control performed by the electric parking brake devices, since the number of the braked wheels does not change (from 2 wheels to 2 wheels), the occurrence of a switching shock (vibrations) caused by the change in the number of the braked wheels can be inhibited. Further, since the braking method itself is not changed in the control transition between hydraulic braking operations in the transition from four-wheel braking to two-wheel braking shown in FIG. 9, the switching shock (vibrations) caused by such a transition (switching) is inhibited. In other words, the occurrence of vibrations, such as a switching shock or a change in posture, can be inhibited when switching to the braking by the electric parking brake devices.

As shown in FIG. 10, in the second embodiment, a transition is also made from the hydraulic braking force control of four wheels to the hydraulic braking force control of two wheels. Therefore, for example, the hydraulic pressure generated in the master cylinder 14 can be introduced into the wheel cylinders 60FL, 60FR even when the brake pedal 12 is depressed in this state. As a result, an uncomfortable feeling such as a difficult stroke of the brake pedal 12 can be reduced even if the brake pedal 12 is depressed.

Further, as shown in FIG. 8, since the braking force on the rear wheel side is increased and the pressure on the front wheel side is thereafter reduced, while maintaining the braking force on the front wheel side, the stopping posture of the vehicle can be maintained even when the vehicle is stopped, for example, on a slope. Further, since the number of the wheels that are the object of the hydraulic braking force control is changed (changed from 4 wheels to 2 wheels) after the vehicle has entirely stopped, the execution of the transitional control of the hydraulic braking force control performed automatically can be made hardly noticeable to the vehicle occupants.

Figure 11:
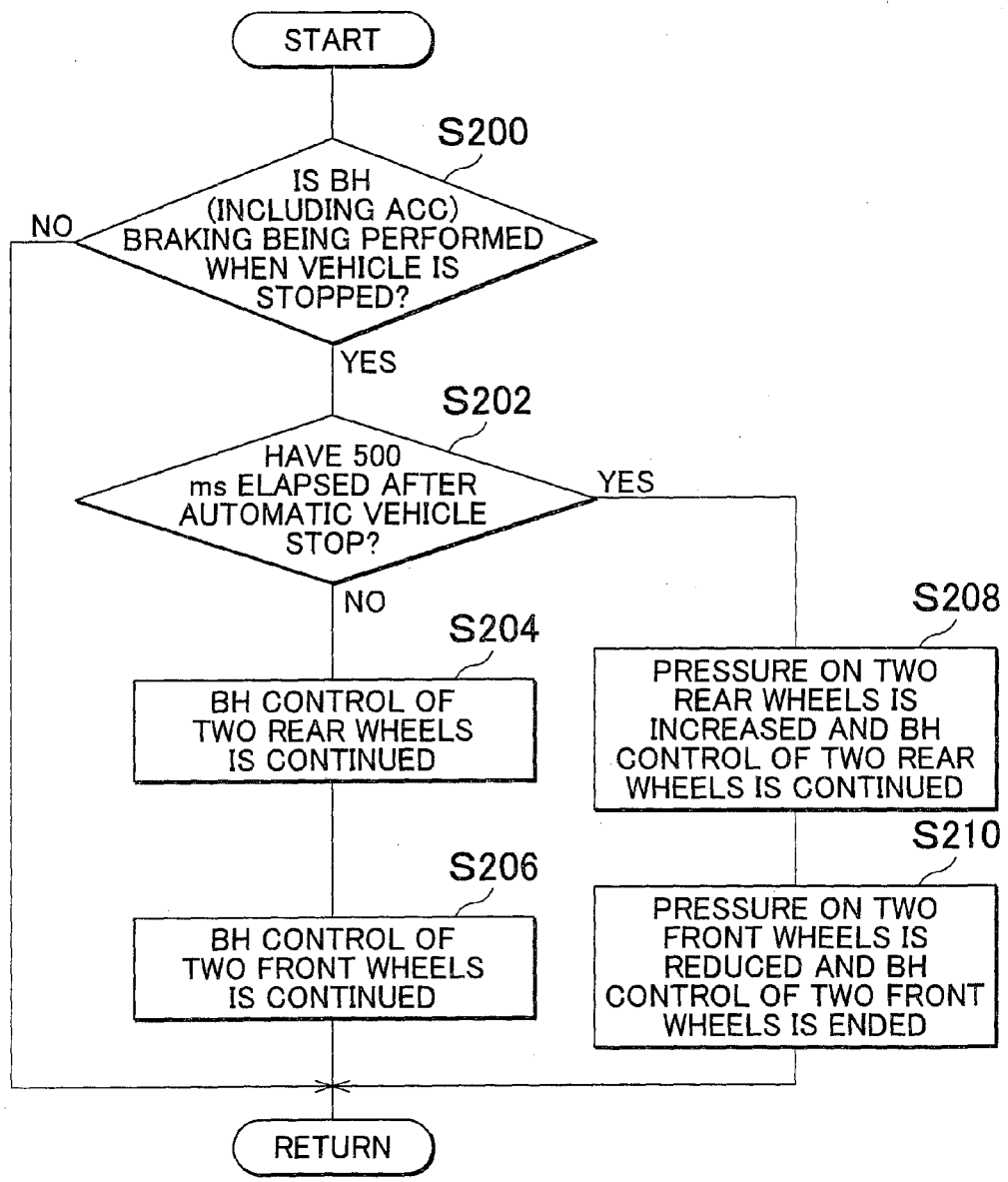
FIG. 11 is a flowchart illustrating the hydraulic braking state in the second embodiment.

FIG. 11 is a flowchart illustrating the processing performed in the ECU 84 of the second embodiment. Similarly to the first embodiment, when the ignition switch of the vehicle is ON, or in a state similar thereto, the ECU 84 repeatedly, with a predetermined period, executes the processing shown in FIG. 11.

The ECU 84 determines whether or not the BH (including also the implementation of the ACC control) braking is being performed when the vehicle is stopped (S200). Where the BH (including also the implementation of the ACC control) braking is not being performed, in other words, where the automatic braking force control is not being performed, when the vehicle is stopped (No in S200), a return is made to the beginning of the flowchart for the processing of the next period. Further, where it is determined in step S200 that the BH control is being performed when the vehicle is stopped (Yes in S200), it is determined, from a signal from the wheel speed sensor 80 or the like, whether a predetermined period of time, for example, 500 ms, has elapsed after the automatic stop (S202). When it is detected in step S202 that the predetermined period of time, for example, 500 ms, has not elapsed after the automatic stop (No in S202), the automatic braking force maintenance (BH) control of the two rear wheels is continued (S204) and the automatic braking force maintenance (BH) control of the two front wheels is also continued (S206). In other words, the BH control is continued by the hydraulic braking force control of four wheels, and a return is made to the beginning of the flowchart for the processing of the next period.

Meanwhile, where it is detected in step S202, on the basis of a signal from the wheel speed sensor 80 or the like, that the predetermined period of time, for example 500 ms, has elapsed after the automatic stop (Yes in S202), the ECU 84 increases the pressure in the wheel cylinders 60RL, 60RR on the rear wheel side correspondingly to the braking force on the front wheel side and continues the BH control on the rear wheel side (S208), as explained with reference to FIG. 8. Then, as explained with reference to FIG. 9, the ECU 84 reduces the pressure in the wheel cylinders 60FL, 60FR on the front wheel side and ends the BH control only on the front wheel side (S210).

With such processing, since the number of the braked wheels does not change, it is possible to inhibit the occurrence of vibrations, such as a switching shock or changes in posture, even when the vehicle is stopped during the automatic braking force control and switching is thereafter made to the braking by the electric parking brake devices. Further, the occurrence of an uncomfortable feeling such as a difficult stroke of the brake pedal 12 can be inhibited even when the brake pedal 12 is depressed when the vehicle is stopped. In the flowchart shown in FIG. 11, an example is explained in which the transition in the hydraulic braking force control from four wheels to two wheels is started when 500 ms elapse after the vehicle has been automatically stopped, but the period of time till the start of such a transition can be selected, as appropriate, provided that the transition to the hydraulic braking force control of two wheels can be completed prior to switching to the braking by the electric parking brake devices. However, it is preferred that the control transition be started at the initial stage after the automatic stop in order to ensure the operation feeling when the brake pedal 12 is depressed.

In the flowchart shown in FIG. 11, where the BH state (stop holding state) is continued for a predetermined period of time, for example, where 3 min elapse after the vehicle has been stopped, switching is performed to the operation control of the electric parking brake devices, and the hydraulic braking force control is canceled. Thus, after a braking force has been generated by the electric parking brake devices, it is not necessary to drive the control valves of the hydraulic actuator 82 and it is also not necessary to drive the electric motor 102. Therefore, the consumption of battery power can be inhibited.

In the above-described embodiment, an example is described in which the hydraulic pressure value corresponding to the pressure reduction value on the front wheel side is increased on the rear wheel side. In another example, the pressure increase value on the rear wheel side may be increased by a predetermined amount irrespectively of the pressure reduction value on the front wheel side. In this case, the pressure increase-reduction control is simplified by comparison with the case in which the control is performed by associating the increase in pressure with the reduction in pressure. When the control such as described hereinabove, is performed, it is also desirable that the total braking force not be reduced. Therefore, it is preferred that the pressure increase value on the rear wheel side be made equal to or higher than the pressure reduction value on the front wheel side.

Third Embodiment

Figure 12:
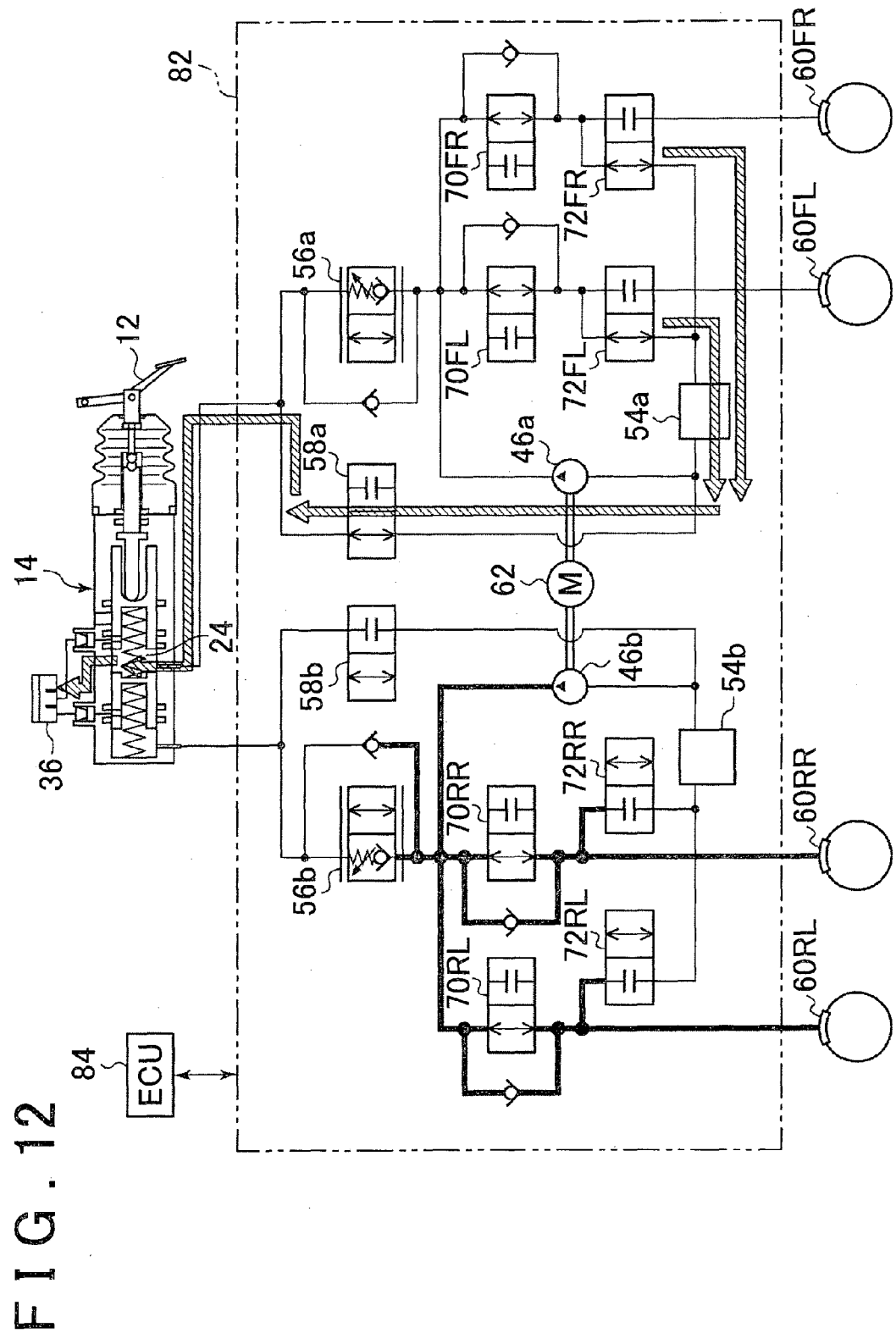
FIG. 12 is an explanatory drawing illustrating the hydraulic pressure state in the third embodiment.
Figure 13:
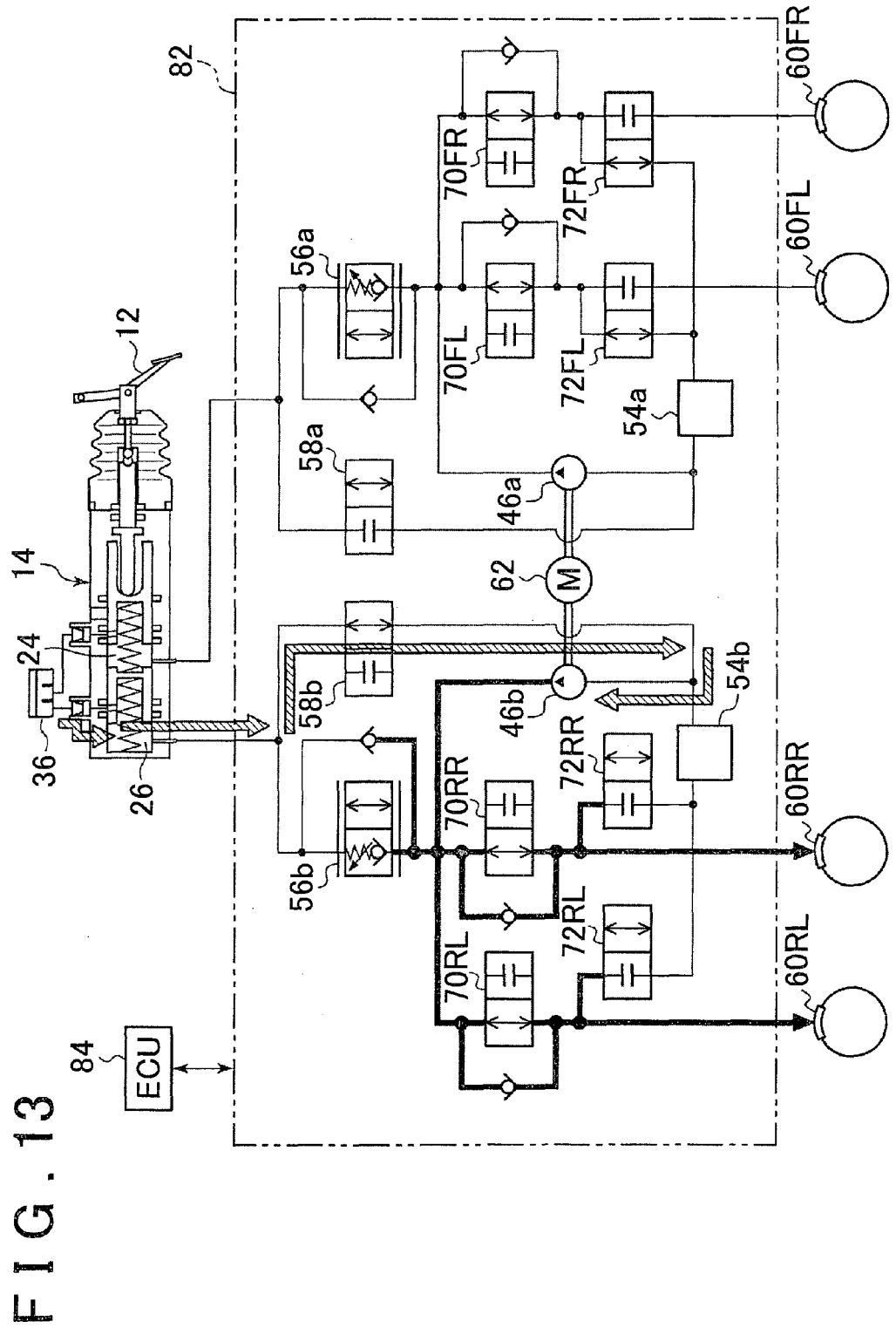
FIG. 13 is an explanatory drawing illustrating the hydraulic pressure state in the third embodiment.

The third embodiment is explained below with reference to FIGS. 12 to 14. In the above-described first embodiment and second embodiment, the control is explained in which the condition that the vehicle speed is equal to zero (stopped vehicle), or the condition that a predetermined period time has elapsed after the vehicle speed has become zero (the vehicle has stopped) is taken as the predetermined speed condition during the automatic braking force control. In the third embodiment, a case is explained in which a control condition that the vehicle speed is equal to or lower than a predetermined speed is taken as the predetermined speed condition during the automatic braking force control.

The hydraulic pressure state when the brake system 10 executes the automatic braking force control (ACC control) is the same as the state shown in FIG. 7. Therefore, this state can be understood by referring to FIG. 7, and detailed explanation thereof is herein omitted. When the automatic braking force control is executed, the ECU 84 drives the motor 62 and causes the pumps 46a, 46b to discharge the working liquid in a state in which the linear control valves 56a, 56b are closed, the pressure-increasing valves 70FL to 70RR are open, and the pressure-reducing valves 72FL to 72RR are closed. As a result, the hydraulic pressure is supplied to the wheel cylinders 60FL to 60RR, and the hydraulic braking force control can be performed regardless of the braking request operation performed by the driver. In other words, the automatic braking force control is realized as the vehicle runs, including the time immediately before the vehicle is stopped.

As mentioned hereinabove, where the BH control is continued for a long time, it results in undesirable heat generation in the driven control valves and consumption of drive power. Therefore, in the automatic braking force control, it is desirable that switching to the braking by the electric parking brake devices be rapidly performed after the vehicle has been stopped. Accordingly, in the third embodiment, a transition is made from the hydraulic braking force control of four wheels to the hydraulic braking force control of two wheels before the vehicle is stopped, and switching to the braking by the electric parking brake device is performed immediately after the vehicle has been stopped, thereby inhibiting the occurrence of a switching shock (vibrations) caused by a change in the number of the braked wheels and a change in the braking method. Further, the operation feeling of the brake pedal 12 can be improved even during the automatic braking force control, provided it is immediately before the vehicle is stopped.

When the vehicle speed becomes, for example, equal to or less than 10 km/h during the automatic braking force control, the ECU 84 starts the transition from the hydraulic automatic braking force control of four wheels to the hydraulic automatic braking force control of the wheels on which the electric parking brake devices have been mounted (two rear wheels). More specifically, as shown in FIG. 12, the ECU 84 intermittently, for example, with a predetermined period, opens the pressure-reducing valves 72FL, 72FR on the front wheel side and the cut valve 58a from the hydraulic pressure state shown in FIG. 7 and intermittently returns the working liquid accumulated in the wheel cylinders 60FL, 60FR into the master cylinder reservoir 36 through the internal reservoir 54a and the first liquid chamber 24 of the master cylinder 14. At the same time, the ECU 84 opens the cut valve 58b and drives the pump 46b with a period inverted with respect to the valve opening period of the pressure-reducing valves 72FL, 72FR and the cut valve 58a, that is, at timings at which the pressure-reducing valves 72FL, 72FR and the cut valve 58a are closed, and draws up the working liquid of the master cylinder reservoir 36 through the second liquid chamber 26. The working liquid is then supplied to the wheel cylinders 60RL, 60RR through the pressure-increasing valves 70RL, 70RR, and the pressure in the wheel cylinders 60RL, 60RR is intermittently increased. In other words, a transition from the hydraulic braking force control of all of the wheels to the hydraulic braking force control of the wheels on which the electric parking brake devices have been mounted is performed in a stepwise manner. Since the reduction of pressure in the wheel cylinders 60FL, 60FR and the increase of pressure in the wheel cylinders 60FR, 60RR are performed intermittently in a counterphase relationship, the braking force balance of the front and rear wheels in the vehicle running state can be inhibited from being abruptly changed by the automatic braking force control, and the transition in the hydraulic braking force control from four wheels to two wheels can be realized smoothly. Further, the pressure reduction value representing the intermittent pressure reduction on the front wheel side may be equal to or different from the pressure increase value representing the intermittent pressure increase on the rear wheel side, but since it is desirable not to decrease the total braking force, it is preferred that the pressure increase value be larger than the pressure reduction value.

Figure 14:
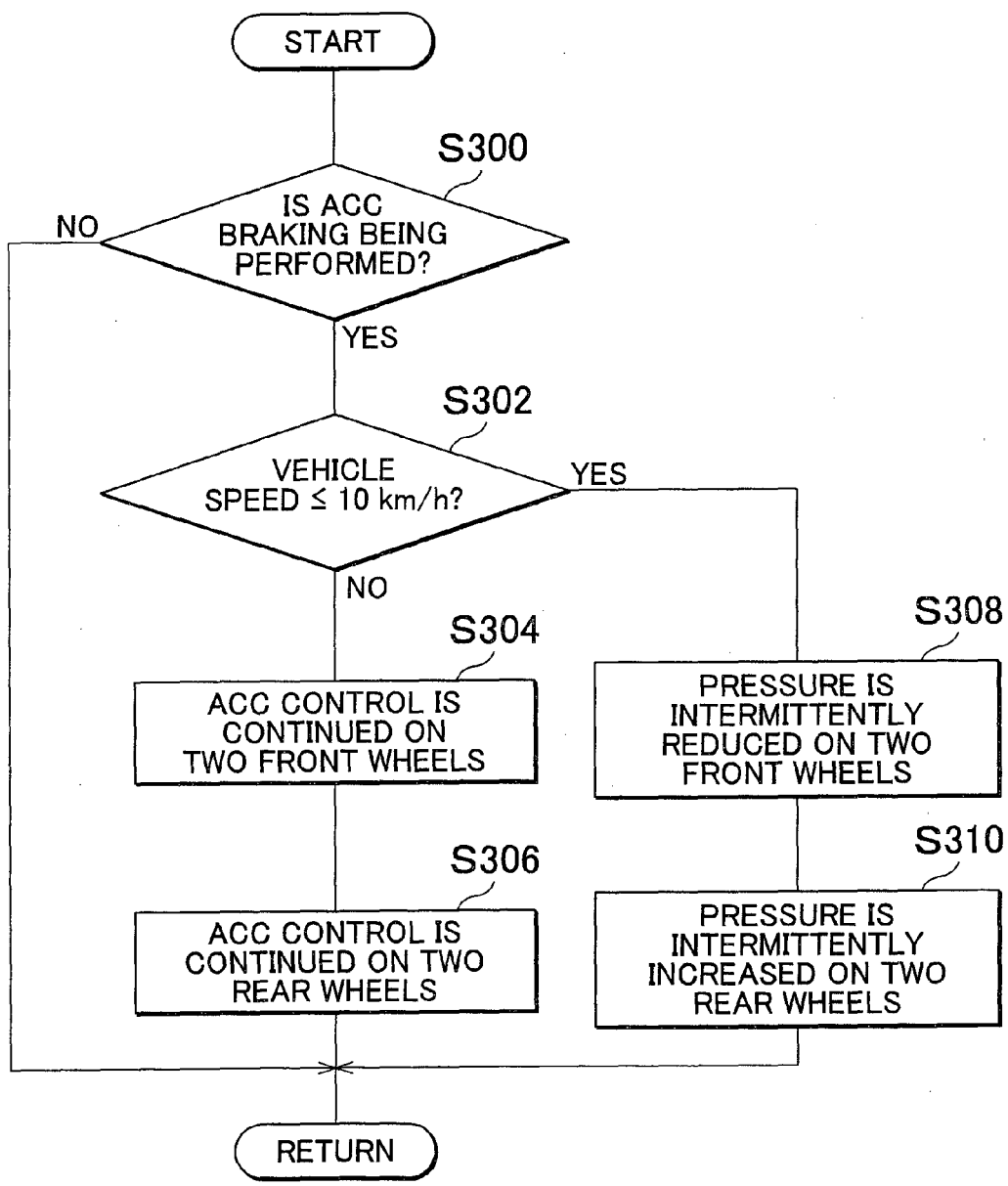
FIG. 14 is a flowchart illustrating the hydraulic braking state in the third embodiment.

FIG. 14 is a flowchart illustrating the processing performed in the ECU 84 of the third embodiment. Similarly to the first and second embodiments, when the vehicle ignition switch is ON, or in a state similar thereto, the ECU 84 repeatedly executes, with a predetermined period, the processing shown in FIG. 14.

When the automatic braking force control (ACC control) is not being executed (No in S300), the ECU 84 returns to the beginning of the flowchart for the processing of the next period. When it is determined in S300 that the ACC control is being executed (Yes in S300) and the vehicle speed is, for example, not equal to or less than 10 km/h (No in S302), the automatic braking force control (ACC control) of the two front wheels is continued (S304) and the automatic braking force control (ACC control) of the two rear wheels is also continued (S306). In other words, the automatic braking force control is continued by the hydraulic braking force control of four wheels according to the behavior of the vehicle ahead or the like, and a return is made to the beginning of the flowchart for the processing of the next period.

Meanwhile, where the vehicle speed becomes equal to or less than 10 km/h during the automatic braking force control (Yes in S302), the ECU 84 temporarily opens the pressure-reducing valves 72FL, 72FR on the front wheel side and intermittently reduces the hydraulic pressure in the wheel cylinders 60FL, 60FR (S308), as explained with reference to FIG. 12. The ECU 84 also intermittently increases the hydraulic pressure in the wheel cylinders 60RL, 60RR by driving the pump 46b on the rear wheel side at a timing at which the pressure-reducing valves 72FL, 72FR are closed after being open (S310), and a return is made to the beginning of the flowchart for the processing of the next period. By intermittently and repeatedly, reducing the pressure on the front wheel side and increasing the pressure on the rear wheel side, it is possible to make a transition from the hydraulic braking force control of four wheels to the hydraulic braking force control of two wheels.

By performing such processing, it is possible to make a transition from the hydraulic braking force control of all of the wheels (four wheels) to the hydraulic braking force control of two wheels, as automatic braking force control, while maintaining the braking force same as that during braking at all of the wheels as the braking force of the entire vehicle at a stage before the vehicle is stopped. Therefore, switching can be rapidly performed from the hydraulic braking force control of two wheels to the braking control of two wheels by the electric parking brake device after the vehicle has been stopped. In this case, since the number of the braked wheels does not change (from 2 wheels to 2 wheels), the occurrence of a switching shock (vibrations) caused by a change in the number of the braked wheels can be inhibited. Further, as explained with reference to FIGS. 12 and 13, since the transition from four-wheel control to two-wheel control is a transition between hydraulic braking operations, rather than a change in the braking method, a switching shock (vibrations) caused by the switching is inhibited. Further, since the pressure increasing-reducing control is performed intermittently in a counterphase relationship, changes in the braking force are unlikely to appear during the transition in the hydraulic braking force control from four wheels to two wheels, and smooth control transition can be realized. Further, the execution of the transitional control of the hydraulic braking force control performed automatically can be made hardly noticeable to the vehicle occupants.

Since the transition from the hydraulic braking force control of four wheels to the hydraulic braking force control of two wheels is also performed in the third embodiment, for example, the hydraulic pressure generated in the master cylinder 14 can be introduced into the wheel cylinders 60FL, 60FR even when the brake pedal 12 is depressed in this state. As a result, the uncomfortable feeling such as a difficult stroke of the brake pedal 12 can be reduced even if the brake pedal 12 is depressed.

In the flowchart shown in FIG. 14, an example is shown in which a transition in the hydraulic braking force control from four wheels to two wheels is started when the vehicle speed is equal to or less than 10 km/h, but the transition start timing can be selected, as appropriate, provided that the hydraulic braking force control of two wheels is completed prior to the transition to the braking performed by the electric parking brake devices. It is, however, describable that the control transition from the hydraulic braking force control of four wheels to the hydraulic braking force control of two wheels be started early within the range in which the vehicle behavior is not destabilized in order to ensure the operation feeling when the brake pedal 12 is depressed.

In the flowchart shown in FIG. 14, switching is performed to the operation control of the electric parking brake devices and the hydraulic braking force control is canceled when the control transition from the hydraulic braking force control of four wheels to the hydraulic braking force control of two wheels is completed, the BH state (stop holding state) is thereafter reached, and the BH state is maintained for a predetermined period of time, for example, when 3 min elapse after the vehicle has been stopped. Thus, it is not necessary to drive the control valves of the hydraulic actuator 82 and it also not necessary to drive the electric motor 102 after the braking force has been generated by the electric parking brake devices. Therefore, the consumption of battery power can be inhibited.

In the above-described embodiment, an example is described in which the hydraulic pressure on the rear wheel side is increased by a value corresponding to the pressure reduction value on the front wheel side. In another example, the pressure increase value on the rear wheel side may be a predetermined amount irrespectively of the pressure reduction value on the front wheel side. In this case, the pressure increase-reduction control can be simplified by comparison with the case in which the control is performed by associating the increase in pressure with the reduction in pressure. It is preferred that the pressure increase value on the rear wheel side be made equal to or higher than the pressure reduction value on the front wheel side.

Fourth Embodiment

FIGS. 15A and 15B are flowcharts illustrating the fourth embodiment which is a variation example of the third embodiment. As mentioned hereinabove, when a transition is made from the hydraulic braking force control of four wheels to the hydraulic braking force control of two wheels as the vehicle runs, the vehicle behavior can become unstable under certain road conditions. For example, when the vehicle runs on a low-μ road surface, where the braking balance of rear and front wheels changes, the antilock brake system (ABS) or skid inhibiting device (VSC) can be actuated. When the vehicle behavior stabilization control is thus executed, the correction of vehicle behavior is prioritized and a return is made to the braking control using all four wheels.

In the flowcharts shown in FIGS. 15A and 15B, when the ignition switch of the vehicle is ON, or in a state similar thereto, the ECU 84 repeatedly, with a predetermined period, executes the processing shown in FIGS. 15A and 15B.

The ECU 84 determines whether or not the automatic braking force control (ACC control) is being performed (S400). Where the automatic braking force control (ACC control) is not being performed (No in S400), a return is made to the beginning of the flowchart for the processing of the next period. When it is determined in S400 that the ACC control is being performed (Yes in S400), it is determined whether or not the vehicle speed is less, for example, than 10 km/h (S402). Where it is determined in S402 that the vehicle speed is not less than 10 km/h (No in S402), a flag indicating a four-wheel ACC control restart state is set OFF (S404). Then, the automatic braking force control (ACC control) of the two rear wheels is continued (S406), and the automatic braking force control (ACC control) of the two front wheels is also continued (S408). In other words, the automatic braking force control is continued by the hydraulic braking force control (ACC control) of four wheels according to the behavior of the vehicle ahead or the like, and a return is made to the beginning of the flowchart for the processing of the next period. In this case, the braking control aimed at four wheels can be executed even when the ABS or VSC operates.

When the vehicle speed becomes less than 10 km/h during the automatic braking force control (Yes in S402), the ECU 84 determines whether the wheel cylinder pressure of the front wheels is equal to the wheel cylinder pressure of the rear wheels (S410). Here, a difference in the wheel cylinder pressure between the front wheels and rear wheels is sometimes provided in the ACC control. In this case, whether or not the present wheel cylinder pressures of the front wheels and rear wheels correspond to the wheel cylinder pressures of the front wheels and rear wheels that have been set in the ACC control may be determined in S410, instead of determining whether or not the wheel cylinder pressure of the front wheels is equal to the wheel cylinder pressure of the rear wheels. When it is determined in S410 that the wheel cylinder pressure of the front wheels is equal to the wheel cylinder pressure of the rear wheels (Yes in S410), it is determined whether or not the four-wheel ACC control restart state is reached (S412). Where it is determined in S412 that the four-wheel ACC control restart state is reached (Yes in S412), a transition is made to S406 and the automatic braking force control of four wheels is continued. In other words, when it is desirable to stop the vehicle while stabilizing the vehicle behavior, as in the case where a transition is once made from the hydraulic braking force control of four wheels to the hydraulic braking force control of two wheels, but the control is then again returned to the hydraulic braking force control of four wheels, the automatic braking force control of four wheels is continued even when a predetermined speed condition is fulfilled during the automatic braking force control.

Meanwhile, where it is determined in S412 that the four-wheel ACC control restart state is not reached (No in S412), it is assumed that the vehicle behavior is stabilized at this stage, and the pressure-reducing valves 72FL, 72FR on the front wheel side are temporarily open to reduce intermittently the hydraulic pressure in the wheel cylinders 60FL, 60FR, as explained hereinabove with reference to FIG. 12 (S414). The ECU 84 also intermittently increases the hydraulic pressure of the wheel cylinders 60RL, 60RR by driving the pump 46b on the rear wheel side at timings at which the pressure-reducing valves 72FL, 72FR are closed after being open (S416). Where the transition from the hydraulic braking force control of four wheels to the hydraulic braking force control of two wheels has thus been started, the ECU 84 detects, on the basis of signals from the wheel speed sensors 80FL to 80RR or a yaw sensor, whether the ABS or VSC is being operated. It is thereafter determined whether or not the ABS or VSC is being operated (S418). Where it is determined in S418 that the ABS or VSC is not being operated (No in S418), a return is made to the beginning of the flowchart for the processing of the next period. Meanwhile, where it is detected in S418 that the ABS or VSC is being operated (Yes in S418), the flag indicating the four-wheel ACC control restart state is set ON to reset the processing of steps S414, S416 (S420). A return is then made to the beginning of the flowchart for the processing of the next period. Where the flag indicating the four-wheel ACC control restart state is ON, a transition is made in S412 to S406 and the ACC control is executed on four wheels till the vehicle is stopped automatically.

Where it is determined in S410 that the wheel cylinder pressure of the front wheels is not equal to wheel cylinder pressure of the rear wheels (No in S410), it is determined whether or not the four-wheel ACC control restart state is reached (S422). Where it is determined in S422 that the four-wheel ACC control restart state is not reached (No in S422), the automatic braking force control (ACC control) of the two rear wheels is continued (S424) and the automatic braking force control (ACC control) of the two front wheels is also continued (S426). A transition is then made to S418, and the ECU 84 detects, on the basis of signals from the wheel speed sensors 80FL to 80RR or the yaw sensor, whether or not the ABS or VSC is being operated. Subsequent processing is the same as explained hereinabove.

Meanwhile, where it is determined in S422 that the four-wheel ACC control restart state is reached (Yes in S422), the pressure-reducing valves 72FL, 72FR on the front wheel side are closed and the hydraulic pressure of the wheel cylinders 60FL, 60FR is intermittently increased (S428). The ECU 84 also intermittently reduces the hydraulic pressure of the wheel cylinders 60RL, 60RR (S430). A return is then made to the beginning of the flowchart for the processing of the next period.

In the fourth embodiment, the contents of the processing performed after the transition has been made from the hydraulic braking force control of four wheels to the hydraulic braking force control of two wheels and the vehicle has been stopped is the same as that explained in the third embodiment and the same effect can be obtained. In other words, switching is performed to the operation control of the electric parking brake devices and the hydraulic braking force control is canceled when the transition from the hydraulic braking force control of four wheels to the hydraulic braking force control of two wheels is completed, the BH state (stop holding state) is thereafter reached and the BH state is maintained for a predetermined period of time, for example, when 3 min elapse after the vehicle has been stopped. Thus, after a braking force has been generated by the electric parking brake devices, it is not necessary to drive the control valves of the hydraulic actuator 82 and it is also not necessary to drive the electric motor 102. Therefore, the consumption of battery power can be inhibited. Further, when the vehicle behavior stabilization control is executed during the automatic braking force control, the control is returned to the hydraulic braking force control of all of the wheels. Therefore, the automatic braking force control can be performed while implementing good behavior stabilization control.

In this embodiment, the pressure reduction value representing the intermittent pressure reduction on the front wheel side may be also equal to or different from the pressure increase value representing the intermittent pressure increase on the rear wheel side, but since it is desirable not to decrease the total braking force, it is preferred that the pressure increase value be larger than the pressure reduction value.

Fifth Embodiment

FIGS. 16A and 16B are flowcharts illustrating the fifth embodiment which is a variation example of the second embodiment. As mentioned hereinabove, where the BH control is performed following the ACC control, the stopping state is automatically maintained by the electric parking brake devices, regardless of the braking request operation performed by the driver. However, with a certain road state, the stopping state cannot be maintained by braking (two-wheel braking) which is automatically performed by the electric parking brake devices. This issue is addressed in the fifth embodiment.

In the fifth embodiment, similarly to the second embodiment, when the ignition switch of the vehicle is ON, or in a state similar thereto, the ECU 84 repeatedly, with a predetermined period, executes the processing shown in FIGS. 16A and 16B.

The ECU 84 determines whether or not the BH (including also the implementation of the ACC control) braking is being performed when the vehicle is stopped (S500). Where it is determined in S500 that the BH (including also the implementation of the ACC control) braking is not being performed, in other words, where the automatic braking force control is not being performed, when the vehicle is stopped (No in S500), a return is made to the beginning of the flowchart for the processing of the next period. Further, where it is determined in step S500 that the BH control is being performed when the vehicle is stopped (Yes in S500), it is determined, from a signal from the wheel speed sensor 80 or the like, whether a predetermined period of time, for example, 500 ms, has elapsed after the automatic stop (S502). When it is detected in step S502 that the predetermined period of time, for example, 500 ms, has not elapsed after the automatic stop (No in S502), a flag for outputting a "vehicle instability warning" to the driver is set OFF (S504). The "vehicle instability warning" is issued, for example, by lighting up a warning light on the instrument panel on the driver's seat side, or displaying a message, such as "vehicle slides down" and "automatic parking impossible", on a display. A warning sound or a warning message may be also outputted by a voice. In this case, the driver takes appropriate measures by manually increasing the parking brake force or changing the stopping position. The warning message may notify the driver of a specific appropriate measure. When the flag for outputting the "vehicle instability message" is ON, the ECU 84 may output, as appropriate, the "vehicle instability message". The automatic braking force maintenance (BH) control of the two rear wheels is thereafter continued (S506). The automatic braking force maintenance (BH) control of the two front wheels is thereafter continued (S508). In other words, the BH control is continued by the hydraulic braking force control of four wheels, and a return is made to the beginning of the flowchart for the processing of the next period.

Meanwhile, where it is detected in step S502 that the predetermined period of time, for example 500 ms, has elapsed after the automatic stop (Yes in S502), it is determined whether the wheel cylinder pressure of the front wheels is equal to the wheel cylinder pressure of the rear wheels (S510). Here, a difference in the wheel cylinder pressure between the front wheels and rear wheels is sometimes provided in the ACC control. In this case, whether or not the present wheel cylinder pressures of the front wheels and rear wheels correspond to the wheel cylinder pressures of the front wheels and rear wheels that have been set in the ACC control may be determined in S510, instead of determining whether or not the wheel cylinder pressure of the front wheels is equal to the wheel cylinder pressure of the rear wheels. When it is determined in S510 that the wheel cylinder pressure of the front wheels is equal to the wheel cylinder pressure of the rear wheels (Yes in S510), it is determined whether or not the flag for outputting the "vehicle instability message" is ON (S512). Where it is determined in S512 that the flag for outputting the "vehicle instability message" is ON, the ECU 84 advances to S506, without making a transition to the hydraulic braking force control of two wheels even if the predetermined period of time has elapsed after the vehicle has been stopped. Thus, the BH control of four wheels is continued, the vehicle is inhibited from sliding down, and a return is made to the beginning of the flowchart for the processing of the next period.

Where it is determined in S512 that the flag for outputting the "vehicle instability warning" is OFF (No in S512), the present vehicle state after the vehicle has been stopped is stable. In other words, the road state can be considered to be suitable for holding the stopping state. Therefore, the ECU 84 starts the transition processing of hydraulic braking. In other words, the ECU 84 increases the braking force of the wheel cylinders 60RL, 60RR on the rear wheel side correspondingly to the braking force on the front wheel side and continues the BH control on the rear wheel side, as has been explained with reference to FIG. 8 (S514). Then, the ECU 84 reduces the pressure of the wheel cylinders 60FL, 60FR on the front wheel side and ends the BH control only on the front wheel side, as has been explained with reference to FIG. 9 (S516).

The ECU 84 then determines whether the vehicle has slid down and an unstable state has occurred (S518). More specifically, the ECU 84 can detect whether or not the stopping state (parking) can be ensured by the electric parking brake devices, which perform two-wheel braking, by making a transition from the hydraulic braking force control of four wheels to the hydraulic braking force control of two wheels. The braking force generated by the brake device is determined by the friction coefficient of the road and a ground contact load. Therefore, where the road is a low-μ slope, the stopping state sometimes can be maintained by braking using four wheels, but cannot be maintained by two-wheel braking. In other words, where the BH state is ensured with the hydraulic parking brake devices, the vehicle can slid down and an unstable state can occur. The sliding-down of the vehicle that should be stopped can be detected, for example, on the basis of signals from the wheel speed sensors 80FL to 80RR or yaw rate sensor.

Thus, it can be predicted that where the vehicle slides down under the hydraulic braking force control of two wheels, the stopping state would be difficult to maintain even when switching from the hydraulic braking force control of two wheels to the braking by the electric parking brake devices. Therefore, when the unstable state such as sliding-down of the vehicle is detected in the course of transition to the hydraulic braking force control of two wheels or at a stage after the transition (Yes in S518), the ECU 84 sets ON the flag for outputting the "vehicle instability warning" to the driver (S520). A return is then made to the beginning of the flowchart for the processing of the next period. Where the unstable state such as sliding-down of the vehicle is not detected in S520 (No in S520), a return is made to the beginning of the flowchart for the processing of the next period.

In the flowcharts shown in FIGS. 16A and 16B, it is assumed that the control transition from the hydraulic braking force control of four wheels to the hydraulic braking force control of two wheels is completed without the unstable state of the vehicle being detected. Switching is then performed to the operation control of the electric parking brake devices and the hydraulic braking force control is canceled when the BH state (brake holding state, stop holding state) is reached and the BH state is maintained for a predetermined period of time, for example, where 3 min elapse after the vehicle has been stopped. Thus, after a braking force has been generated by the electric parking brake devices, it is not necessary to drive the control valves of the hydraulic actuator 82 and it is also not necessary to drive the electric motor 102. Therefore, the consumption of battery power can be inhibited.

Where it is determined in S510 that the wheel cylinder pressure of the front wheels is not equal to the wheel cylinder pressure of the rear wheels (No in S510), it is determined whether or not the flag for outputting the "vehicle instability message" is ON (S522). When it is determined in S522 that the flag for outputting the "vehicle instability message" is OFF (No in S522), the automatic braking force maintenance (BH) control of the two rear wheels is continued (S524). The automatic braking force maintenance (BH) control of the two front wheels is thereafter continued (S526). A transition is then made to S518, and the ECU 84 determines whether or not an unstable state in which the vehicle slides down has occurred. Subsequent processing is the same as described hereinabove.

Meanwhile, where it is determined in S522 that the flag for outputting the "vehicle instability message" is ON (Yes in S522), the ECU 84 reduces the pressure of the wheel cylinders 60RL, 60RR on the rear wheel side and continues the BH control on the rear wheel side (S528), contrary to the operations explained with reference to FIG. 8. Further, the pressure of the wheel cylinders 60FL, 60FR on the front wheel side is increased and the BH control on the front wheel side is continued (S530), contrary to the operations explained with reference to FIG. 9. A return is then made to the beginning of the flowchart for the processing of the next period.

Thus, when it is difficult to maintain the stopping state of the vehicle with two wheels by the automatic braking force control, the two-wheel hydraulic braking force control is not executed and the switching to the braking control performed by the electric parking brake devices is prohibited. In other words, since whether or not the stopping state san be maintained is determined prior to switching to the braking control performed by the electric parking brake devices, power consumption by the operation of the electric parking brake devices can be inhibited. Further, a safe position for stopping the vehicle can be recommended.

Sixth Embodiment

The sixth embodiment is explained below with reference to FIGS. 7 to 10 and FIG. 17. In the above-described first embodiment, the control is explained that is performed when a condition that the vehicle speed is equal to zero is fulfilled as the predetermined speed condition during the automatic braking force control, but in the sixth embodiment, an example is explained in which a control condition that a predetermined period of time has elapsed after the vehicle has been stopped is taken as the predetermined speed condition during the automatic braking force control.

FIG. 7 shows the hydraulic pressure state when the brake system 10 executes the automatic braking force control. This state is basically the same as the hydraulic pressure state shown in FIG. 3. When the automatic braking force control is executed, the ECU 84 drives the motor 62 and causes the pumps 46a, 46b to discharge the working liquid in a state in which the linear control valves 56a, 56b are closed, the pressure-increasing valves 70FL to 70RR are open, and the pressure-reducing valves 72FL to 72RR are closed. As a result, the hydraulic pressure is supplied to the wheel cylinders 60FL to 60RR, and the hydraulic braking force control can be performed regardless of the braking request operation performed by the driver. In other words, a state during automatic braking and stopping or during the automatic stopping control (including the time immediately before the vehicle is stopped) is demonstrated.

Where the BH control is continued for a long time in the state shown in FIG. 7, it results in undesirable heat generation in the driven control valves and consumption of drive power. Therefore, in the automatic braking force control, the hydraulic braking force control is switched to the braking by the electric parking brake devices once a predetermined period of time (for example, 3 min) elapses since the vehicle has been stopped. When such switching is performed, where the hydraulic braking force control of four wheels is directly switched to the braking by the electric parking brake devices of two wheels, as described hereinabove, a switching shock (vibrations) caused by a change in the number of the braked wheels or a change in the braking method can occur. Accordingly, in the second embodiment, pretreatment is performed when the electric parking brake devices are actuated.

Where a predetermined period of time (for example, 500 ms) elapses since the vehicle has been stopped, the ECU 84 makes a transition from the hydraulic braking force control of four wheels to the hydraulic braking force control of the wheels (two rear wheels) on which the electric parking brake devices have been mounted. More specifically, as shown in FIG. 8, the ECU 84 further supplies the hydraulic pressure that generates a braking force corresponding to the braking force generated on the front wheel side from the hydraulic pressure state shown in FIG. 7 into the wheel cylinders 60RL, 60RR on the rear wheel side. In other words, the cut valve 58b is opened and only the pump 46b is driven, and the working liquid contained in the master cylinder reservoir 36 is drawn up through the second liquid chamber 26. The working liquid is supplied to the wheel cylinders 60RL, 60RR to raise the pressure therein and increase the hydraulic braking force on the rear wheel side. Where the increase in pressure corresponding to the braking force on the front wheel side is completed, the ECU 84 closes the cut valve 58b and stops the pump 46b, and maintains the high-pressure state of the wheel cylinders 60RL, 60RR, as shown in FIG. 9. The ECU 84 then opens the pressure-reducing valves 72FL, 72FR and the cut valve 58a and returns the working liquid accumulated in the wheel cylinder 60FL, 60FR into the master cylinder reservoir 36 through the internal reservoir 54a and the first liquid chamber 24 of the master cylinder 14. In other words, a transition is made from the hydraulic braking force control of all of the wheels to the hydraulic braking force control of the wheels on which the electric parking brake devices have been mounted. Once the reduction of pressure in the wheel cylinders 60FL, 60FR has been completed, the ECU 84 closes the pressure-reducing valves 72FL, 72FR and the cut valve 58a, as shown in FIG. 10. As a result, the hydraulic braking pressure control is executed only for the two wheels on the rear wheel side.

Thus, by so increasing the hydraulic pressure on the rear wheel side, a transition is made from the hydraulic braking force control of all of the wheels (four wheels) to the hydraulic braking force control of two wheels, as automatic braking force control, while maintaining the braking force same as that during braking at all of the wheels as, the braking force of the entire vehicle (total braking force). Then, where a predetermined period of time (for example, 3 min) elapses after the vehicle has been stopped and switching is performed from the hydraulic braking force control to the parking control performed by the electric parking brake devices, since the number of the braked wheels does not change (from 2 wheels to 2 wheels), the occurrence of a switching shock (vibrations) caused by a change in the number of the braked wheels can be inhibited. Further, since the braking method itself is not changed in the control transition between hydraulic braking operations in the transition from four-wheel braking to two-wheel braking shown in FIG. 9, the switching shock (vibrations) caused by such a transition (switching) is inhibited. In other words, the occurrence of vibrations, such as a switching shock or posture changes, when switching to the braking by the electric parking brake device can be inhibited.

As shown in FIG. 10, in the sixth embodiment, a transition is also made from the hydraulic braking force control of four wheels to the hydraulic braking force control of two wheels. Therefore, for example, the hydraulic pressure generated in the master cylinder 14 can be introduced into the wheel cylinders 60FL, 60FR even when the brake pedal 12 is depressed in this state. As a result, an uncomfortable feeling such as a difficult stroke of the brake pedal 12 can be reduced even if the brake pedal 12 is depressed.

Further, as shown in FIG. 8, since the braking force on the rear wheel side is increased and the pressure on the front wheel side is thereafter reduced, while maintaining the braking force on the front wheel side, the stopping posture of the vehicle can be maintained even when the vehicle is stopped, for example, on a slope. Further, since the number of the wheels that are the object of the hydraulic braking force control is changed (changed from 4 wheels to 2 wheels) after the vehicle has entirely stopped, the execution of the transitional control of the hydraulic braking force control performed automatically can be made hardly noticeable to the vehicle occupants.

FIG. 17 is a flowchart illustrating the processing performed in the ECU 84 of the sixth embodiment. Similarly to the first embodiment, when the ignition switch of the vehicle is ON, or in a state similar thereto, the ECU 84 repeatedly, with a predetermined period, executes the processing shown in FIG. 17.

The ECU 84 determines whether or not the BH (including also the implementation of the ACC control) braking is being performed when the vehicle is stopped (S600). Where the BH (including also the implementation of the ACC control) braking is not being performed, in other words, where the automatic braking force control is not being performed, when the vehicle is stopped, a return is made to the beginning of the flowchart for the processing of the next period (No in S600). Further, where it is determined in step S600 that the BH control is being performed when the vehicle is stopped (Yes in S600), it is determined whether or not a brake operation is performed (S602). Where the brake operation is not performed (No in S602), it is determined, from a signal from the wheel speed sensor 80 or the like, whether a predetermined period of time, for example, 500 ms, has elapsed after the automatic stop (S604). When it is detected in step S604 that the predetermined period of time, for example, 500 ms, has not elapsed after the automatic stop (No in S604), the automatic braking force maintenance (BH) control of the two rear wheels is continued (S606) and the automatic braking force maintenance (BH) control of the two front wheels is also continued (S608). In other words, the BH control is continued by the hydraulic braking force control of four wheels, and a return is made to the beginning of the flowchart for the processing of the next period.

Meanwhile, where it is determined in step S602 that the brake operation is performed (Yes in S602) or where it is detected in S604, on the basis of a signal from the wheel speed sensor 80 or the like, that the predetermined period of time, for example 500 ms, has elapsed after the automatic stop (Yes in S604), the ECU 84 increases the pressure in the wheel cylinders 60RL, 60RR on the rear wheel side correspondingly to the braking force on the front wheel side and continues the BH control on the rear wheel side (S610), as explained with reference to FIG. 8. Then, as explained with reference to FIG. 9, the ECU 84 reduces the pressure in the wheel cylinders 60FL, 60FR on the front wheel side and ends the BH control only on the front wheel side (S612).

With such processing, since the transition is performed in the hydraulic braking force control from four wheels to two wheels, the occurrence of an uncomfortable feeling such as a difficult stroke of the brake pedal 12 can be inhibited even when the brake pedal 12 is depressed when the vehicle is stopped.

Seventh Embodiment

The seventh embodiment is explained below with reference to FIG. 18. In the above-described second embodiment, the control is explained with respect to the case where a predetermined period of time has elapsed after the vehicle has been stopped by the automatic braking force control, but in the seventh embodiment, an example is explained in which the control is performed during the braking operation performed by the user. The device configuration may be the same as, for example, in the second embodiment.

Figure 18:
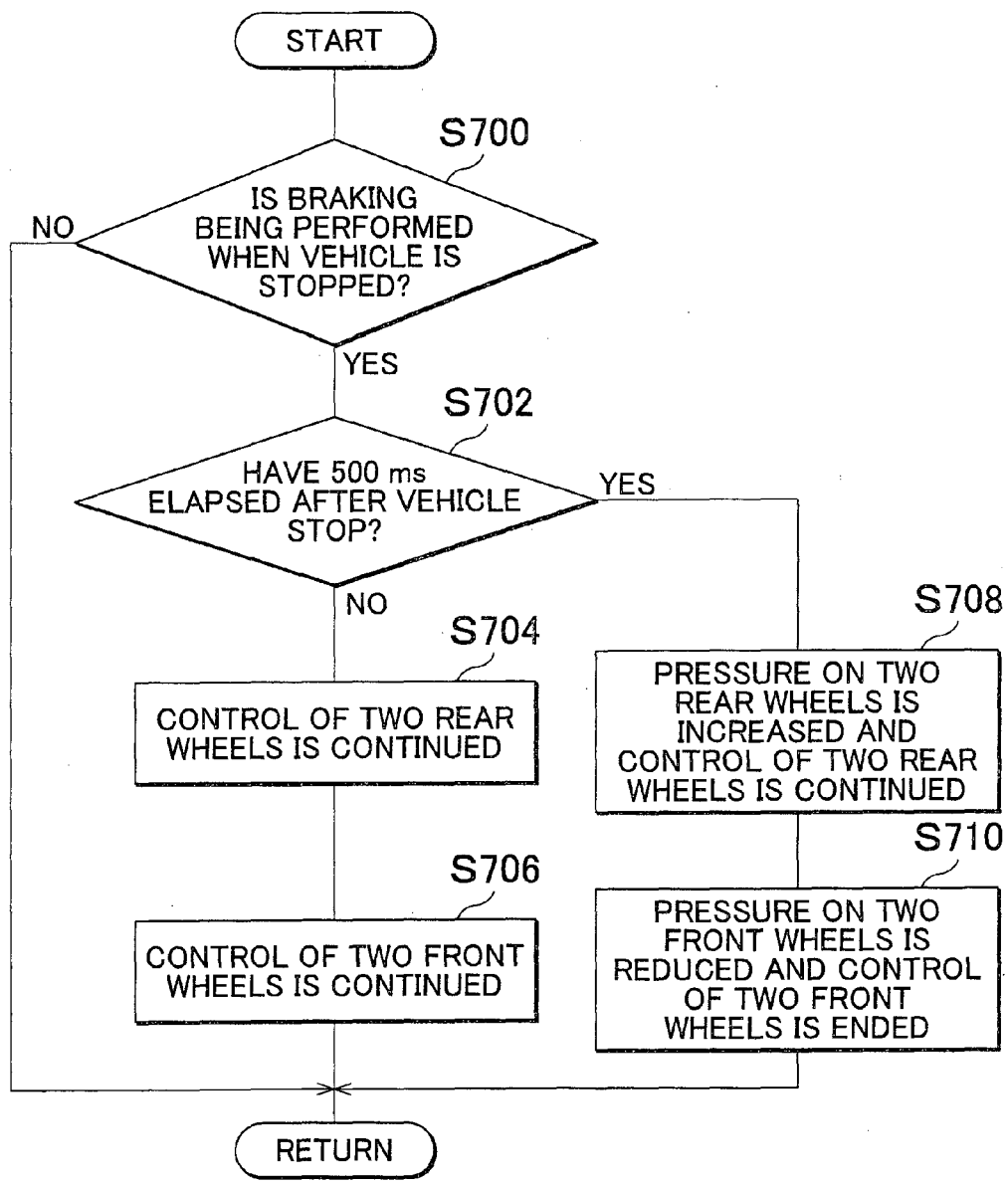
FIG. 18 is a flowchart illustrating the hydraulic braking state in the seventh embodiment.

FIG. 18 is a flowchart illustrating the processing performed in the ECU 84 of the seventh embodiment. Similarly to the second embodiment, when the ignition switch of the vehicle is ON, or in a state similar thereto, the ECU 84 repeatedly, with a predetermined period, executes the processing shown in FIG. 18.

The ECU 84 determines whether or not the brake pedal is being operated when the vehicle is stopped (S700). Where the brake pedal is not being operated (No in S700), a return is made to the beginning of the flowchart for the processing of the next period. Where it is determined in S700 that the brake pedal is being operated when the vehicle is stopped (Yes in S700), it is determined, from a signal from the wheel speed sensor 80 or the like, whether a predetermined period of time, for example, 500 ms, has elapsed after the automatic stop (S702). When it is detected in step S702 that the predetermined period of time, for example, 500 ms, has not elapsed after the automatic stop (No in S702), the braking control of the two front wheels is continued (S704) and the braking control of the two rear wheels is also continued (S706). In other words, the hydraulic braking force control of four wheels is continued and a return is made to the beginning of the flowchart for the processing of the next period.

Meanwhile, where it is detected in S702, on the basis of a signal from the wheel speed sensor 80 or the like, that the predetermined period of time, for example, 500 ms, has elapsed after the automatic stop (Yes in S702), the pressure in the wheel cylinders 60RL, 60RR on the rear wheel side is increased correspondingly to the braking force on the front wheel side and the braking control on the rear wheel side is continued (S708). Then, the ECU 84 reduces the pressure in the wheel cylinders 60FL, 60FR on the front wheel side and ends the braking control on the front wheel side (S710).

With such processing, since the number of the braked wheels does not change, it is possible to inhibit the occurrence of vibrations, such as a switching shock or a change in posture, even when the vehicle is stopped during the braking force control and switching is thereafter made to the braking by the electric parking brake devices. Further, in the flowchart shown in FIG. 18, an example is explained in which the transition in the hydraulic braking force control from four wheels to two wheels is started when 500 ms elapse after the vehicle has been automatically stopped, but the period of time till the start of such a transition can be selected, as appropriate, provided that the transition to the hydraulic braking force control of two wheels can be completed prior to switching to the braking by the electric parking brake devices.

The contents of the fourth embodiment and fifth embodiment explained using the brake system 10 can be also used in a hydraulic brake system 200, and the same effect can be obtained.

In the above-described embodiments, the brake system 10 performing the automatic braking force control and hydraulic brake system 200 are explained as examples of the brake system, but any system can be used, provided that the transition could be made from the hydraulic braking force control of four wheels to the hydraulic braking force control of only those wheels on which the electric parking brake devices have been mounted, and the switching could be thereafter performed to the electric parking brake devices. In such a case, the same effect can be obtained.

In the above-described embodiments, a four-wheel vehicle is explained by way of example, but the techniques of the above-described embodiments can be also used in six-wheel, eight-wheel, and other multiwheel vehicles, and the same effect can be obtained. Further, in the above-described embodiments, the case is explained in which the electric parking brake devices are mounted on the two rear wheels, but the wheels for mounting the electric parking brake devices can be selected, as appropriate, according to vehicle specifications, and the front wheels may be also selected for mounting. Further, the number of wheels for mounting the electric parking brake devices is not limited to 2, and may be, for example, 1. When the total number of wheels is equal to or greater than 4, for example, 6 or 8, the number of the electric parking brake devices may be equal to or greater than 3, and the effect that can be obtained in such a case is the same as in the above-described embodiments.

Further, in the above-described embodiments, an example of the electric parking brake device is described in which the lock nut 120 located inside the piston 110 is actuated by an electric actuator (configured by a combination of the electric motor 102, the reducer 116, and the screw shaft 118), and the disk rotor 104 is squeezed by the brake pads 106a, 106b, but electric parking brake devices of various structures can be used. For example, an electric parking brake device may be used of a type in which a disk rotor is squeezed by a pair of brake pads by winding up a wire with an electric motor, and the effect that can be obtained in such a case is the same as in the above-described embodiments. In the above-described embodiments, a disk brake unit is described in which the electric parking brake device is integrated with the disk brake unit, but the electric parking brake device and the disk brake unit may be provided separately, and the effect that can be obtained in such a case is the same as in the above-described embodiments.

The invention is explained hereinabove with reference to the above-described embodiments, but the invention is not limited to the above-described embodiments, and the configurations obtained by appropriately combining or substituting the configurations of the embodiments or variation examples are also included in the invention. Further, modifications such as various design changes can be also added to the embodiments on the basis of the knowledge of a person skilled in the art, and the embodiments subjected to such modifications are also included in the scope of the invention.

What is claimed is:

1. A brake system comprising:
   a hydraulic brake device that supplies a hydraulic pressure to a wheel cylinder provided correspondingly to each wheel mounted on a vehicle, thereby pressing friction members against the wheels and applying a hydraulic braking force;
   an electric parking brake device that is mounted on at least one wheel from among the wheels and applies a braking force to the wheel by drive of an electric actuator; and
   an ECU configured to execute control of supply of hydraulic pressure to each wheel cylinder by the hydraulic brake device and operation control of the electric parking brake device, regardless of a braking request operation performed by a driver, and causes a transition from hydraulic braking force control of all of the wheels to hydraulic braking force control of the wheel on which the electric parking brake device has been mounted, when a speed state of the vehicle satisfies a predetermined speed condition during the hydraulic braking force control of all of the wheels.

2. The brake system according to claim 1, wherein
   when the transition to the hydraulic braking force control of the wheel on which the electric parking brake device has been mounted is completed, and a predetermined condition is fulfilled after the vehicle has been stopped, the ECU is configured to switch from the hydraulic braking force control of the wheel on which the electric parking brake device has been mounted to the operation control of the electric parking brake device.

3. The brake system according to claim 2, wherein
   the ECU is configured to determine that the predetermined condition has been fulfilled after the vehicle has been stopped, when a predetermined set time elapses after the vehicle has been stopped.

4. The brake system according to claim 2, wherein
   the ECU is configured to determine whether or not a stopping state of the vehicle can be maintained only by the wheel on which the electric parking brake device has been mounted on the basis of behavior of the vehicle after the transition to the hydraulic braking force control of the wheel on which the electric parking brake device has been mounted is completed, and
   the ECU is configured not to switch to the operation control of the electric parking brake device when the stopping state cannot be maintained.

5. The brake system according to claim 1, wherein
   the ECU is configured to decrease the hydraulic pressure in at least one wheel from among all of the wheels when the braking request operation performed by the driver is detected during the hydraulic braking force control of all of the wheels.

6. The brake system according to claim 1, wherein
   the ECU is configured to return to the hydraulic braking force control of all of the wheels when behavior stabilization control of the vehicle is executed after the transition to hydraulic braking force control of the wheel on which the electric parking brake device has been mounted.

7. The brake system according to claim 1, wherein
   the ECU is configured to take a condition that the vehicle speed is equal to or less than a predetermined speed as the predetermined speed condition.

8. The brake system according to claim 1, wherein
   the ECU is configured to take a condition that the vehicle speed reaches zero as the predetermined speed condition.

9. The brake system according to claim 1, wherein
   the ECU is configured to take a condition that a predetermined period of time elapses after the vehicle has been stopped as the predetermined speed condition.

10. The brake system according to claim 1, wherein
    the ECU is configured to cancel the hydraulic control of wheels on which the electric parking brake device is not mounted when causing the transition from the hydraulic braking force control of all of the wheels to the hydraulic braking force control of the wheel on which the electric parking brake device has been mounted.

11. The brake system according to claim 10, wherein
    the ECU is configured to increase the hydraulic pressure of the wheel on which the electric parking brake device has been mounted prior to canceling the hydraulic control of the wheels on which the electric parking brake device is not mounted.

12. The brake system according to claim 11, wherein
when increasing the hydraulic pressure of the wheel on which the electric parking brake device has been mounted, the ECU is configured to increase the hydraulic pressure corresponding to the hydraulic pressure of the wheels on which the electric parking brake device is not mounted and for which the hydraulic control is to be canceled.

13. A brake system comprising:
a hydraulic brake device that supplies a hydraulic pressure to a wheel cylinder provided correspondingly to each wheel mounted on a vehicle, thereby pressing friction members against the wheels and applying a hydraulic braking force;
an electric parking brake device that is mounted on at least one wheel from among the wheels and applies a braking force to the wheel by drive of an electric actuator; and
an ECU is configured to execute control of supply of hydraulic pressure to each wheel cylinder by the hydraulic brake device and operation control of the electric parking brake device, and causes a transition from hydraulic braking force control of all of the wheels to hydraulic braking force control of the wheel on which the electric parking brake device has been mounted, when a speed state of the vehicle satisfies a predetermined speed condition during the hydraulic braking force control of all of the wheels.

\* \* \* \* \*